US012595882B2

(12) United States Patent
Hayashi et al.

(10) Patent No.: US 12,595,882 B2
(45) Date of Patent: Apr. 7, 2026

(54) ELECTRIC-POWERED LUBRICATOR, AND METHOD FOR CALIBRATING ELECTRIC-POWERED LUBRICATOR

(71) Applicant: MAKITA CORPORATION, Anjo (JP)

(72) Inventors: Yuki Hayashi, Anjo (JP); Hidefumi Hagiwara, Anjo (JP)

(73) Assignee: MAKITA CORPORATION, Anjo (JP)

( * ) Notice: Subject to any disclaimer, the term of this patent is extended or adjusted under 35 U.S.C. 154(b) by 46 days.

(21) Appl. No.: 18/605,216

(22) Filed: Mar. 14, 2024

(65) Prior Publication Data

US 2024/0318776 A1 Sep. 26, 2024

(30) Foreign Application Priority Data

Mar. 22, 2023 (JP) ................................. 2023-045206

(51) Int. Cl.
*F16N 13/06* (2006.01)

(52) U.S. Cl.
CPC ........ *F16N 13/06* (2013.01); *F16N 2013/063* (2013.01)

(58) Field of Classification Search
CPC ........ F16N 2013/063; F16N 7/38; F16N 7/34; F16N 27/00; F16N 3/12; F16N 21/00; F16N 13/06; G01F 111/10
USPC ...................................................... 184/105.2
See application file for complete search history.

(56) References Cited

U.S. PATENT DOCUMENTS 8,915,331 B2 * 12/2014 Alekseyev ................ H02P 7/08
                                                            184/105.2
2007/0137942 A1 * 6/2007 Weems ..................... F16N 5/02
                                                            184/105.2
2015/0176762 A1 * 6/2015 Conley ................... F16N 29/02
                                                            184/26
2020/0266738 A1 * 8/2020 Koeppel ................. F16N 13/06

FOREIGN PATENT DOCUMENTS

JP         2020-133832 A      8/2020

* cited by examiner

*Primary Examiner* — Anna M Momper
*Assistant Examiner* — Mark K Buse
(74) *Attorney, Agent, or Firm* — Oliff PLC

(57) ABSTRACT

An electric-powered lubricator in one aspect of the present disclosure includes a first manual switch, an electric motor, a drive circuit, a pump, a memory device, and a control circuit. The memory device stores one or more reference values. Each of the one or more reference values corresponds to a mass of lubricant to be dispensed from a dispensing port of the pump per reciprocation of a plunger of the pump. The control circuit in a calibration mode calculates a new reference value based on (i) an input value and (ii) a count of reciprocation of the plunger. The input value corresponds to a measured total mass of the lubricant dispensed from the dispensing port.

13 Claims, 22 Drawing Sheets

ELECTRIC-POWERED LUBRICATOR, AND METHOD FOR CALIBRATING ELECTRIC-POWERED LUBRICATOR

CROSS-REFERENCE TO RELATED APPLICATIONS

The present application claims the benefit of Japanese Patent Application No. 2023-045206 filed on Mar. 22, 2023 with the Japan Patent Office, the entire disclosure of which is incorporated herein by reference.

BACKGROUND

The present disclosure relates to an electric-powered lubricator.

U.S. Pat. No. 8,915,331 B2 discloses a battery-powered grease gun configured to keep track of a dispensed amount of lubricant based on a Hall signal that indicates movements of a plunger.

SUMMARY

Volume and density of lubricant can vary depending on the surrounding environment and/or the type of lubricant. Therefore, it may be difficult for the aforementioned grease gun to estimate the actual dispensed amount of lubricant with high accuracy.

In one aspect of the present disclosure, it is desirable that a dispensed amount of lubricant from an electric-powered lubricator can be estimated with high accuracy.

In the present disclosure, terms such as "first", "second", and the like only intend to distinguish one element from another, and do not intend to limit the order or the number of the elements. Accordingly, a first element may be referred to as a second element, and similarly, a second element may be referred to as a first element. Additionally, a first element may be included without a second element, and similarly, a second element may be included without a first element.

One aspect of the present disclosure provides an electric-powered lubricator including a first manual switch, an electric motor, a drive circuit, a pump, a memory device, and a control circuit.

The first manual switch is configured to be manually operated by a user of the electric-powered lubricator. The electric motor is configured to generate a driving force. The drive circuit is configured to drive the electric motor. The pump includes a dispensing port, a chamber, and a plunger. The dispensing port communicates with the chamber. The chamber is configured to accommodate a lubricant. The plunger is (i) within the chamber and (ii) configured to reciprocate within the chamber by the driving force of the electric motor so as to dispense the lubricant within the chamber from the dispensing port. The memory device is configured to store one or more reference values. Each of the one or more reference values corresponds to a mass of the lubricant to be dispensed from the dispensing port per reciprocation of the plunger.

The control circuit is configured to switch its operating mode between two or more operating modes including a calibration mode and a normal mode.

The control circuit in the calibration mode is configured to perform:

a first operation to drive the electric motor via the drive circuit based on the first manual switch being manually operated;

a second operation to calculate a count of reciprocation of the plunger based on the first manual switch being manually operated;

a third operation to calculate a new reference value based on (i) an input value and (ii) the count of reciprocation, the input value corresponding to a measured total mass of the lubricant dispensed from the dispensing port; and a fourth operation to update any of the one or more reference values stored in the memory device with the new reference value calculated.

The control circuit in the normal mode is configured to perform:

a fifth operation to drive the electric motor via the drive circuit based on the first manual switch being manually operated;

a sixth operation to calculate the count of reciprocation based on the first manual switch being manually operated;

a seventh operation to calculate an estimated value based on (i) any of the one or more reference values stored in the memory device and (ii) the count of reciprocation, the estimated value corresponding to an estimated total mass of the lubricant dispensed from the dispensing port; and an eighth operation (i) to display on a display device the estimated value calculated, and/or (ii) to control the electric motor via the drive circuit based on the estimated value calculated.

In the electric-powered lubricator configured as above, any of the one or more reference values stored in the memory device can be calibrated by switching the operating mode of the control circuit from the normal mode to the calibration mode. As a result, the control circuit in the normal mode can estimate the total mass of the lubricant dispensed from the dispensing port with high accuracy.

Another aspect of the present disclosure provides a method for calibrating an electric-powered lubricator, including:

reciprocating a plunger of the electric-powered lubricator to dispense a lubricant from the electric-powered lubricator;

calculating a count of reciprocation of the plunger;

calculating a reference value based on (i) an input value and (ii) the count of reciprocation, the reference value corresponding to a mass of the lubricant to be dispensed from the electric-powered lubricator per reciprocation of the plunger, the input value corresponding to a measured total mass of the lubricant dispensed from the electric-powered lubricator; and updating the reference value stored in a memory device of the electric-powered lubricator with the reference value calculated.

According to the reference value calibrated by the method as above, the total mass of the lubricant dispensed from the electric-powered lubricator can be estimated with high accuracy.

BRIEF DESCRIPTION OF THE DRAWINGS

Example embodiments of the present disclosure will be described hereinafter with reference to the accompanying drawings, in which.

DETAILED DESCRIPTION OF EXEMPLARY EMBODIMENTS

1. Overview of Embodiments

Figure 1:
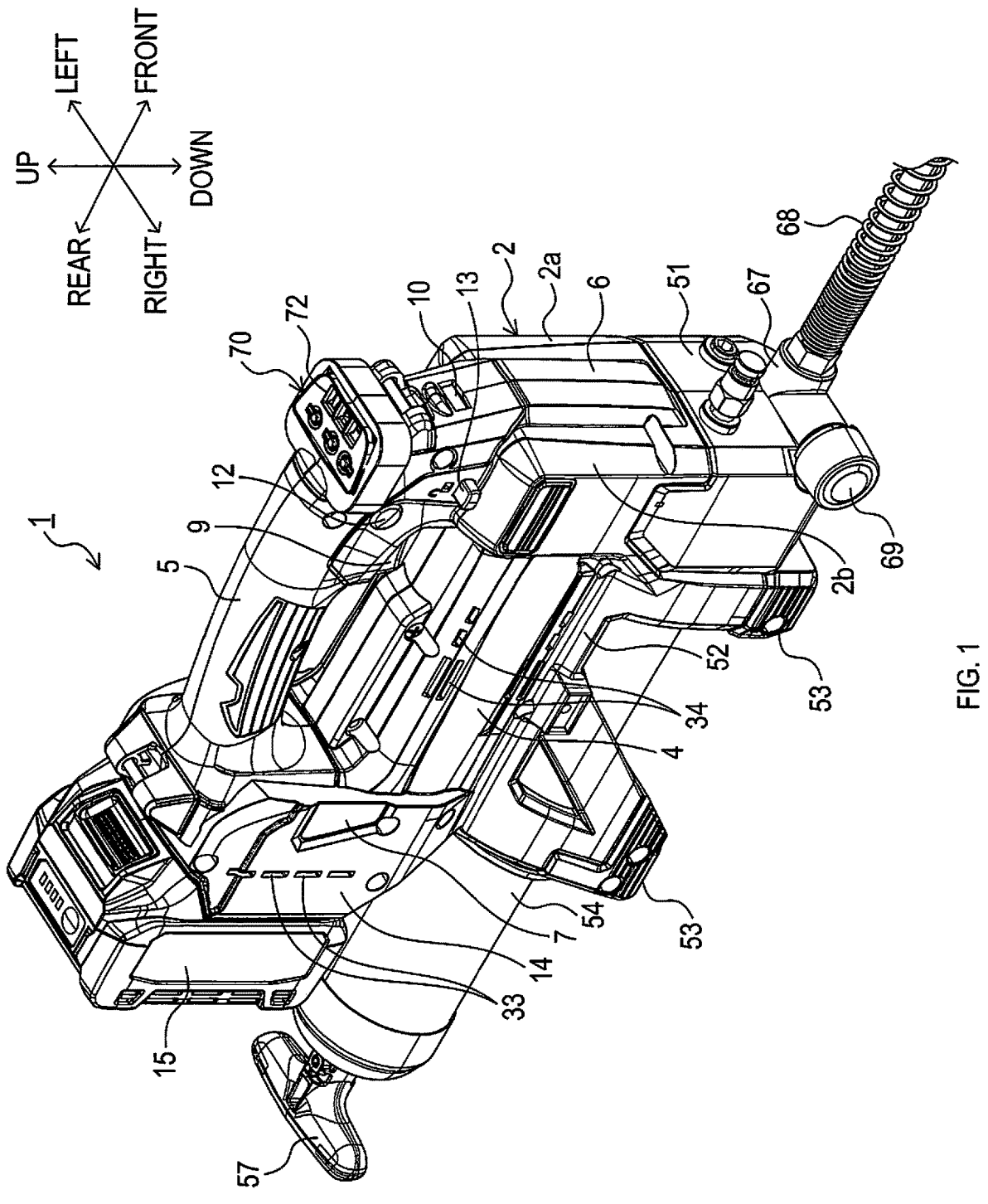
FIG. 1 is a perspective view of an electric-powered lubricator in a first embodiment.

One embodiment may provide an electric-powered lubricator (or electric-powered oil syringe or electric-powered grease gun) including at least any one of:

Feature 1: a first manual switch configured to be manually operated by a user of the electric-powered lubricator;

Feature 2: an electric motor configured to generate a driving force;

Feature 3: a drive circuit configured to drive the electric motor;

Feature 4: a pump including a dispensing port, a chamber, and a plunger;

Feature 5: the dispensing port communicates with the chamber;

Feature 6: the chamber is configured to accommodate a lubricant;

Feature 7: the plunger is (i) within the chamber and (ii) configured to reciprocate within the chamber by the driving force of the electric motor so as to dispense (or discharge) the lubricant within the chamber from the dispensing port;

Feature 8: a memory device configured to store one or more reference values;

Feature 9: each of the one or more reference values corresponds a mass of the lubricant to be dispensed from the dispensing port per reciprocation of the plunger;

Feature 10: a control circuit;

Feature 11: the control circuit is configured to switch its operating mode between two or more operating modes including a calibration mode and a normal mode;

Feature 12: the control circuit in the calibration mode is configured to perform a first operation to drive the electric motor via the drive circuit based on (or in response to) the first manual switch being manually operated;

Feature 13: the control circuit in the calibration mode is configured to perform a second operation to calculate a count of reciprocation of the plunger (or the number of reciprocation of the plunger) based on (or in response to) the first manual switch being manually operated;

Feature 14: the control circuit in the calibration mode is configured to perform a third operation to calculate a new reference value based on (i) an input value and (ii) the count of reciprocation;

Feature 15: the input value corresponds to a measured total mass of the lubricant dispensed from the dispensing port;

Feature 16: the control circuit in the calibration mode is configured to perform a fourth operation to update (or overwrite) any of the one or more reference values stored in the memory device with the new reference value calculated;

Feature 17: the control circuit in the normal mode is configured to perform a fifth operation to drive the electric motor via the drive circuit based on (or in response to) the first manual switch being manually operated;

Feature 18: the control circuit in the normal mode is configured to perform a sixth operation to calculate the count of reciprocation based on (or in response to) the first manual switch being manually operated;

Feature 19: the control circuit in the normal mode is configured to perform a seventh operation to calculate an estimated value based on (i) any of the one or more reference values stored in the memory device and (ii) the count of reciprocation;

Feature 20: the estimated value corresponds to an estimated total mass of the lubricant dispensed from the dispensing port; and Feature 21: the control circuit in the normal mode is configured to perform an eighth operation (i) to display on a display device the estimated value calculated, and/or (ii) to control the electric motor via the drive circuit based on the estimated value calculated.

In the electric-powered lubricator including at least Features 1 through 21, any of the one or more reference values stored in the memory device can be calibrated by switching the operating mode of the control circuit to the calibration mode. As a result, the control circuit in the normal mode can display the estimated value with high accuracy on the display device, and/or control the electric motor based on the estimated value with high accuracy.

One embodiment may include, in addition to or in place of at least any one of Features 1 through 21, Feature 22: the control circuit in the calibration mode is configured to drive the electric motor via the drive circuit so as to reciprocate the plunger a predefined number of times in the first operation.

In the electric-powered lubricator including at least Features 1 through 22, since the control circuit in the calibration mode reciprocates the plunger the predefined number of times, the user is not required to manually adjust an amount of the lubricant to be dispensed from the dispensing port for calibrating the one or more reference values.

One embodiment may include, in addition to or in place of at least any one of Features 1 through 22, at least any one of:

Feature 23: a second manual switch configured to be manually operated by the user; and Feature 24: the control circuit in the calibration mode is configured (i) to receive the input value via the second manual switch and (ii) to calculate the new reference value based on the input value received and the count of reciprocation, in the third operation.

In the electric-powered lubricator including at least Features 1 through 21, 23, and 24, the user can manually input the input value to the electric-powered lubricator via the second manual switch.

One embodiment may include, in addition to or in place of at least any one of Features 1 through 24, at least any one of:

Feature 25: the control circuit in the calibration mode is configured to receive the input value from a scale in the third operation; and Feature 26: the scale is configured (i) to measure an actual total mass of the lubricant dispensed from the dispensing port and (ii) to transmit the input value to the control circuit.

The electric-powered lubricator including at least Features 1 through 21, 25, and 26 can automatically acquire the input value from the scale. Accordingly, a workload of the user required for calibration of any of the one or more reference values can be reduced.

One embodiment may include, in addition to or in place of at least any one of Features 1 through 26, Feature 27: the input value is a fixed value.

In the electric-powered lubricator including at least Features 1 through 21, and 27, the user can calibrate any of the one or more reference values by dispensing an amount of the lubricant corresponding to the input value, without manually entering the input value to the electric-powered lubricator.

One embodiment may include, in addition to or in place of at least any one of Features 1 through 27, at least any one of:

Feature 28: the memory device is configured to store the input value which is a fixed value;

Feature 29: the control circuit in the calibration mode is configured to calculate the new reference value based on (i) the input value stored in the memory device and (ii) the count of reciprocation, in the third operation;

Feature 30: the control circuit in the calibration mode is configured to perform a ninth operation (i) to receive the input value from scale and (ii) to stop the electric motor via the drive circuit based on the input value received having reached the input value stored in the memory device; and Feature 31: the scale is configured (i) to measure an actual total mass of the lubricant dispensed from the dispensing port and (ii) to transmit the input value to the control circuit.

In the electric-powered lubricator including at least Features 1 through 21, and 28 through 30, dispensing of the lubricant is stopped based on the input value acquired from the scale having reached the fixed value. Accordingly, the user is not required to manually adjust the amount of the lubricant to be dispensed to the scale for calibration of any of the one or more reference values, and the workload of the user can be reduced.

One embodiment may include, in addition to or in place of at least any one of Features 1 through 31, at least any one of:

Feature 32: the control circuit in the normal mode is configured to perform a tenth operation to stop the electric motor via the drive circuit based on the estimated value calculated having reached a desired value (or a target value); and Feature 33: the desired value corresponds to a desired total mass (or a target total mass) of the lubricant dispensed from the dispensing port.

In the electric-powered lubricator including at least Features 1 through 21, 32, and 33, dispensing of the lubricant is automatically stopped based on the estimated value having reached the desired value. Accordingly, the user can dispense a desired amount of the lubricant without manually adjusting the amount of the lubricant to be dispensed from the dispensing port.

One embodiment may include, in addition to or in place of at least any one of Features 1 through 33, at least any one of:

Feature 34: a third manual switch configured to be manually operated by the user;

Feature 35: the two or more operating modes include a setting change mode;

Feature 36: the one or more reference values include two or more reference values;

Feature 37: the memory device is configured to store the two or more reference values in association with respective two or more calibration settings;

Feature 38: the control circuit in the setting change mode is configured to select one of the two or more calibration settings based on (or in response to) the third manual switch being manually operated;

Feature 39: the control circuit in the calibration mode is configured to update (or overwrite) a reference value associated with the calibration setting selected, with the new reference value, in the fourth operation; and Feature 40: the control circuit in the normal mode is configured to calculate the estimated value based on (i) the reference value associated with the calibration setting selected, and (ii) the count of reciprocation, in the seventh operation.

The electric-powered lubricator including at least Features 1 through 21, and 34 through 40 can store the two or more reference values in association with the respective two or more calibration settings. The electric-powered lubricator can calibrate the reference value associated with the calibration setting selected. Additionally, the electric-powered lubricator can (i) display on the display device the estimated value corresponding to the calibration setting selected, and/or (ii) control the electric motor based on the estimated value corresponding to the calibration setting selected.

In the electric-powered lubricator as above, if the memory device stores the two or more reference values in association with the types of the lubricant, or the surrounding environments such as the temperatures, the user is not required to calibrate the one or more reference values each time the types of the lubricant or the surrounding environments change, and the workload of the user can be reduced.

One embodiment may include, in addition to or in place of at least any one of Features 1 through 40, at least any one of:

Feature 41: a fourth manual switch configured to be manually operated by the user;

Feature 42: the two or more operating modes include a manual input mode; and

Feature 43: the control circuit in the manual input mode is configured to update (or vary) any of the one or more reference values stored in the memory device based on (or in response to) the fourth manual switch being manually operated.

In the electric-powered lubricator including at least Features 1 through 21, and 41 through 43, the user can manually enter a reference value corresponding to the type of the lubricant to be used or the surrounding environment to the electric-powered lubricator.

One embodiment may include, in addition to or in place of at least any one of Features 1 through 43, at least any one of:

Feature 44: a fifth manual switch configured to be manually operated by the user; and Feature 45: the control circuit is configured to switch its operating mode between the two or more operating modes based on (or in response to) the fifth manual switch being manually operated.

In the electric-powered lubricator including at least Features 1 through 21, 44, and 45, the user can manually switch the operating mode of the control circuit between the two or more operating modes.

One embodiment may include, in addition to or in place of at least any one of Features 1 through 45, at least one of:

Feature 46: the electric-powered lubricator includes the display device;

Feature 47: the lubricant is in semisolid form; and

Feature 48: the lubricant includes grease.

In one embodiment, the lubricant may be in liquid form or in solid form.

One embodiment may provide a method including at least any one of:

Feature 49: reciprocating a plunger of an electric-powered lubricator to dispense a lubricant from the electric-powered lubricator;

Feature 50: calculating a count of reciprocation of the plunger (or the number of reciprocation of the plunger);

Feature 51: calculating a reference value based on (i) an input value and (ii) the count of reciprocation;

Feature 52: the reference value corresponds to a mass of the lubricant to be dispensed from the electric-powered lubricator per reciprocation of the plunger;

Feature 53: the input value corresponds to a measured total mass of the lubricant dispensed from the electric-powered lubricator; and Feature 54: updating (or overwriting) the reference value stored in a memory device of the electric-powered lubricator with the reference value calculated.

According to the reference value calibrated by the method including at least Features 49 through 54, the total mass of the lubricant dispensed from the electric-powered lubricator can be estimated with high accuracy.

In one embodiment, the control circuit may be integrated into a single electronic unit or a single electronic device or a single circuit board.

In one embodiment, the control circuit may be a combination of two or more electronic circuits or two or more electronic units or two or more electronic devices, each of which is separately disposed on the electric-powered lubricator or within the electric-powered lubricator.

In one embodiment, the control circuit may be programmed and/or hardwired so as to operate in the aforementioned two or more operating modes.

In one embodiment, the control circuit may include a microcomputer (or a microcontroller or a microprocessor), a wired logic, an application specific integrated circuit (ASIC), an application specific standard product (ASSP), a programmable logic device (such as a field programmable gate array (FPGA)), a discrete electronic component, and/or a combination of the foregoing.

In one embodiment, the memory device may include a volatile memory, and/or a rewritable and non-volatile memory. Examples of the rewritable and non-volatile memory include an Electrically Erasable Programmable Read-Only Memory (EEPROM), a flash memory, a Resistive Random Access Memory (ReRAM), and a Ferroelectric Random Access Memory (FeRAM).

All of or at least two of the first through fifth manual switches may be a common manual switch.

Examples of the first through fifth manual switches include a trigger switch, a push-button switch, a toggle switch, a slide switch, a dial switch, a tactile switch, a membrane switch, a rotary switch, a DIP switch, a keyboard, a touch panel, a touch screen, and a Graphical User Interface (GUI).

In one embodiment, the electric-powered lubricator may be a battery-powered lubricator.

In one embodiment, the aforementioned Features 1 through 54 may be combined in any manner.

In one embodiment, any of the aforementioned Feature 1 through 54 may be excluded.

2. Specific Example Embodiments

The following example embodiments provide an electric-powered lubricator 1 shown in FIG. 1. The electric-powered lubricator 1 is an electric-powered grease gun configured to dispense semisolid lubricant, more specifically, grease.

2-1. First Embodiment

2-1-1. Mechanical Configuration of Electric-Powered Lubricator

Figure 2:
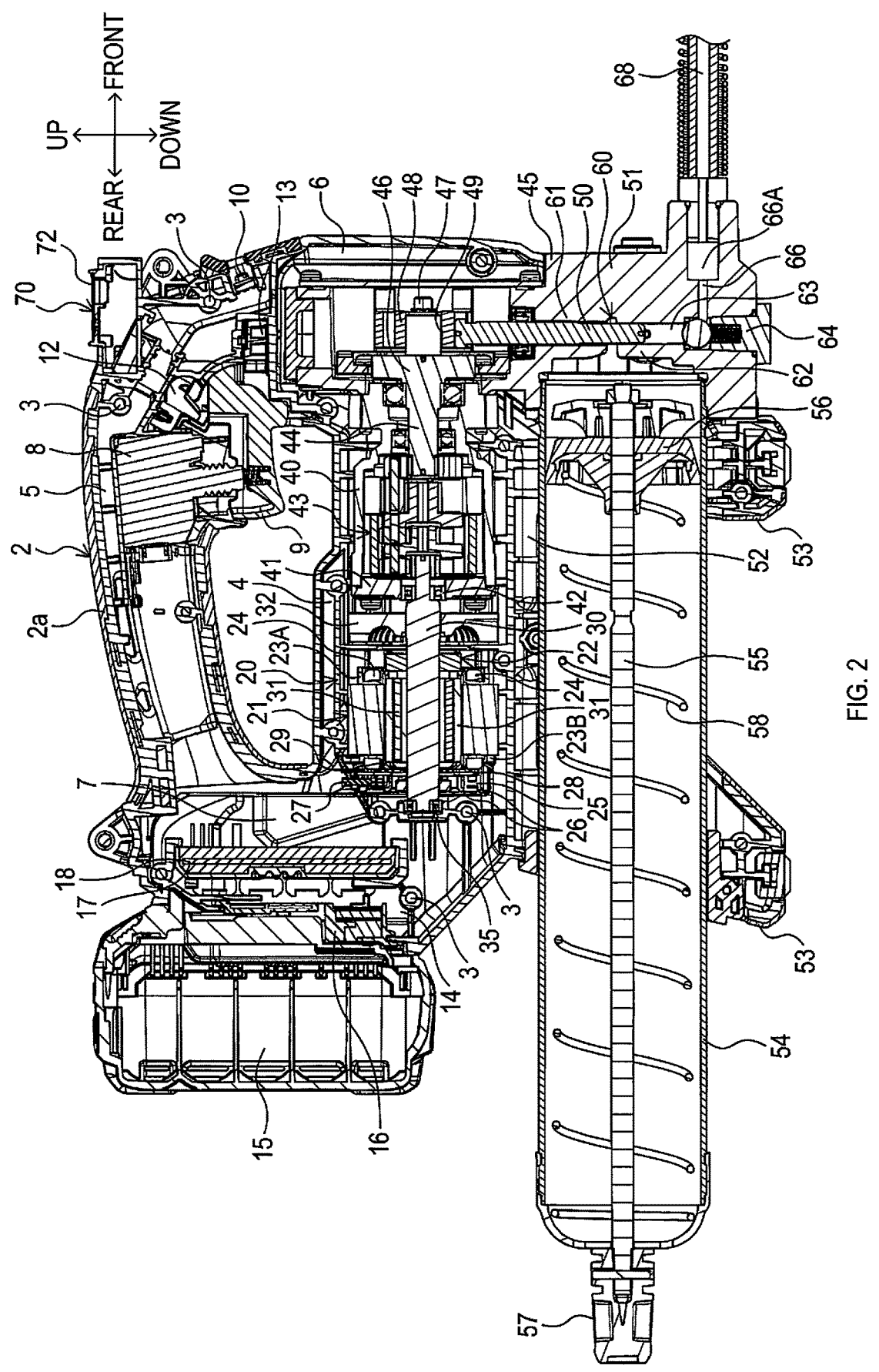
FIG. 2 is a central longitudinal sectional view of the electric-powered lubricator.

As shown in FIGS. 1 and 2, the electric-powered lubricator 1 includes a housing 2. The housing 2 includes a first half housing 2*a* and a second half housing 2*b* joined together by two or more screws 3. The housing 2 includes a motor container 4 at a central portion in its height direction. The height direction corresponds to a direction from the bottom to the top or from the top to the bottom of the housing 2. In the first embodiment, the motor container 4 has a cylindrical shape and extends in a length direction. The length direction corresponds to a direction from the front to the rear or from the rear to the front of the housing 2. The housing 2 includes a grip 5 on its top. In the first embodiment, the grip 5 extends in the length direction and is bent downward. The motor container 4 includes a front joint portion 6 at its front end. The front joint portion 6 is joined to the front end of the grip 5. The motor container 4 includes a rear joint portion 7 at its rear end. The rear joint portion 7 is joined to the rear end of the grip 5. In the first embodiment, the rear joint portion 7 stands upward so as to form a space between the motor container 4 and the grip 5.

The electric-powered lubricator 1 includes a trigger switch 8 accommodated in the grip 5. The electric-powered lubricator 1 includes a trigger 9 for a user of the electric-powered lubricator 1 to manually operate the trigger switch 8. The trigger 9 is pulled by the user to dispense grease. In the first embodiment, the trigger 9 protrudes downward from the grip 5.

The grip 5 includes a light 10 at its front. In the first embodiment, the light 10 includes a not shown light emitting diode (LED) as a light source. The grip 5 includes an operation panel 70 on its front upper surface. The operation panel 70 is configured to be manually operated by the user (i) to turn on or off the light 10 and (ii) to change settings of the electric-powered lubricator 1.

The grip 5 includes a first lock button 12 at the front of the trigger 9. The first lock button 12 is configured to be depressed by the user to lock the trigger 9 in the fully pulled position. The grip 5 includes a second lock button 13 below the first lock button 12. The second lock button 13 is configured to be depressed by the user to lock the trigger 9 in its original position (that is, non-pulled position).

The rear joint portion 7 includes a battery holder 14 at its rear end. The battery holder 14 is configured so that the battery pack 15 is detachably attached to the battery holder 14. In the first embodiment, the battery holder 14 is configured so that the battery pack 15 is attached to the battery holder 14 by sliding the battery pack 15 from the top to the bottom at the rear end of the battery holder 14. In the first embodiment, the battery pack 15 has a rated voltage of 36 volts. The battery holder 14 includes a terminal block 16 inside. The terminal block 16 is configured to be electrically coupled to the battery pack 15 attached to the battery holder 14. In the first embodiment, the terminal block 16 extends in the height direction.

The battery holder 14 accommodates a control unit 17 at the front of the terminal block 16. In the first embodiment, the control unit 17 extends in the height direction. The control unit 17 includes a control circuit board 18.

The motor container 4 accommodates an electric motor 20. In the first embodiment, the electric motor 20 is an inner rotor type three-phase brushless DC motor. In another embodiments, the electric motor 20 may be any other types of electric motors (for example, a brushed DC motor).

The electric motor 20 includes a stator 21. The stator 21 includes three lead wires 27 (FIG. 2 shows only one of the lead wires 27). The stator 21 includes a first insulator 23A at its front end. The stator 21 includes a second insulator 23B at its rear end. The stator 21 includes three coils (that is, a U-phase coil, a V-phase coil, and a W-phase coil) 24 wound via the first insulator 23A and the second insulator 23B. The second insulator 23B includes not shown six terminals fused to respective ends of wires in these coils 24.

The second insulator 23B includes a short-circuit member 25. The short-circuit member 25 includes three insert-molded short-circuit fittings 26 (FIG. 2 shows only two of the short-circuit fittings 26). These short-circuit fittings 26 electrically couple between the aforementioned terminals of the second insulator 23B so that the aforementioned coils 24 form a delta configuration (or a delta connection).

The stator 21 includes a sensor circuit board 28 between the second insulator 23B and the short-circuit member 25. The sensor circuit board 28 includes first through third rotational position sensors 28A through 28C (see FIG. 5). In the first embodiment, the first through third rotational position sensors 28A through 28C are Hall sensors, but are not limited to Hall sensors. The first through third rotational position sensors 28A through 28C are coupled to three signal lines 29 (FIG. 2 shows only one of the signal lines 29). The lead wires 27 and the signal lines 29 are brought out to the battery holder 14 and coupled to the control circuit board 18 of the control unit 17.

The electric motor 20 includes a rotor 22 inside the stator 21. The rotor 22 includes a rotation shaft 30 at its center. The rotation shaft 30 includes two or more permanent magnets 31 embedded in an outer peripheral wall of the rotation shaft 30. The first through third rotational position sensors 28A through 28C (i) are arranged around the rotor 22 and (ii) detect a rotational position of the rotation shaft 30, and also a rotational position of the rotor 22. The rotation shaft 30 includes a fan 32 at its front end. In the first embodiment, the fan 32 extends perpendicular to the rotation shaft 30.

The rear joint portion 7 includes two or more intake ports 33 on each of its left and right side surfaces. Each of the intake ports 33 sucks air into the motor container 4 from its outside in accordance with rotation of the fan 32. The motor container 4 includes two or more exhaust ports 34 on each of its left and right side surfaces. Each of the exhaust ports 34 is positioned radially outside and at the front of the fan 32, and discharges the air sucked into the motor container 4 to the outside of the motor container 4.

The rear joint portion 7 accommodates a first bearing 35 at the rear of the short-circuit member 25. The first bearing 35 rotatably supports the rear end of the rotation shaft 30.

The motor container 4 includes a gear housing 40 at the front of the electric motor 20. In the first embodiment, the gear housing 40 has a cylindrical shape. The gear housing 40 has an opening at its rear end. The gear housing 40 includes a bracket plate 41 attached to this opening. The rotation shaft 30 penetrates the bracket plate 41 and protrudes into the gear housing 40. The bracket plate 41 includes a second bearing 42. The second bearing 42 rotatably supports the front end of the rotation shaft 30.

The gear housing 40 includes a spindle 44 at its front end. The gear housing 40 accommodates a deceleration mechanism 43. The deceleration mechanism 43 is configured (i) to receive rotation of the rotation shaft 30 and (ii) to rotate the spindle 44 at a rotational speed lower than a rotational speed of the rotation shaft 30. The deceleration mechanism 43 may include a planetary gear.

The housing 2 includes a crank housing 45 at the front end of the gear housing 40. In the first embodiment, the crank housing 45 extends in the height direction. The spindle 44 protrudes into the crank housing 45 from the gear housing 40.

The crank housing 45 accommodates a crank board 46 at the front end of the spindle 44. The crank board 46 includes an eccentric pin 47 protruding to the front. The crank housing 45 includes a slider 48 at the front of the crank board 46. The slider 48 has an elongated hole 49 extending in a width direction. The width direction corresponds to a direction from the right to the left or from the left to the right of the housing 2. The slider 48 is supported to be able to move up and down inside the crank housing 45. The eccentric pin 47 is inserted into the elongated hole 49. The slider 48 is coupled to the plunger 50 at the center of its lower end. The plunger 50 includes an upper end coupled to the slider 48 and extends downward.

In the crank housing 45 configured as above, when the crank board 46 rotates together with the spindle 44, the eccentric pin 47 performs eccentric movements. Due to strokes in the height direction of the eccentric pin 47, the slider 48 reciprocates up and down and the plunger 50 also reciprocates up and down.

The crank housing 45 includes a front holder 51 at its lower part. The housing 2 includes a rear holder 52 at the rear of the front holder 51 and at a lower part of the motor housing 4. The rear holder 52 includes two legs 53 protruding downward at its front and rear ends.

The electric-powered lubricator 1 includes a tank 54 supported by the front holder 51 and the rear holder 52. The tank 54 has an open front end. The tank 54 reaches to the rear surface of the front holder 51 through the rear holder 52. The front end of the tank 54 is screwed into the rear surface of the front holder 51. In other words, the tank 54 extends in the length direction below the motor container 4.

The tank 54 accommodates a rod 55. The rod 55 extends from the rear end of the tank 54 to the front end of the tank 54. The rod 55 holds a piston 56 in a manner movable along the rod 55. The rod 55 has a rear end protruding from the tank 54. The tank 54 includes a handle 57 attached to the rear end of the rod 55. The tank 54 accommodates a coil spring 58. The coil spring 58 is located at the rear of the piston 56 and biases the piston 56 to the front. The tank 54 accommodates a not shown cartridge filled with grease at the front of the piston 56. When this cartridge is pressed by the piston 56, the grease is delivered into the front holder 51.

The front holder 51 includes a pump 60. The pump 60 includes the aforementioned plunger 50. The pump 60 includes an upper cylindrical portion 61 and a lower cylindrical portion 62. The upper cylindrical portion 61 and the lower cylindrical portion 62 form a chamber 63. The plunger 50 is inside the chamber 63. The chamber 63 communicates with the tank 54. The pump 60 includes a check valve 64 at the lower end of the chamber 63.

The lower cylindrical portion 62 includes a dispensing path 66 that (i) communicates with the chamber 63 and (ii) extends in the length direction. The front holder 51 includes a front cylindrical portion 67 at its front end. The front cylindrical portion 67 protrudes to the front from the front holder 51. The dispensing path 66 passes through the center of the front cylindrical portion 67. The dispensing path 66 has a dispensing port 66A at its front end. The front cylindrical portion 67 is connected to a hose 68. The grease is dispensed from the dispensing port 66A to the outside of the electric-powered lubricator 1 via the hose 68.

The front cylindrical portion 67 includes a relief valve 69 at its right side portion. The relief valve 69 is configured to discharge the grease inside the dispensing path 66 to the outside of the electric-powered lubricator 1 in response to a pressure of the grease inside the dispensing path 66 being greater than or equal to a specified pressure.

2-1-2. Mechanical Operation of Electric-Powered Lubricator

In the electric-powered lubricator 1 configured as above, when the user pulls the trigger 9, the electric motor 20 rotates, and then the rotation shaft 30 rotates.

Rotation of the rotation shaft 30 is transmitted to the spindle 44 via the deceleration mechanism 43, and the crank board 46 rotates together with the spindle 44. This causes the eccentric pin 47 to perform eccentric movements and the slider 48 moves up and down, and the plunger 50 reciprocates up and down.

In the pump 60, when the plunger 50 moves upward, the grease flows into the chamber 63 from the tank 54. When the plunger 50 moves downward, the grease inside the chamber 63 flows into the dispensing path 66, and is dispensed from the dispensing port 66A to the outside of the electric-powered lubricator 1 via the hose 68. This dispensing operation is repeated as the plunger 50 reciprocates.

2-1-3. Detail of Operation Panel

Figure 3:
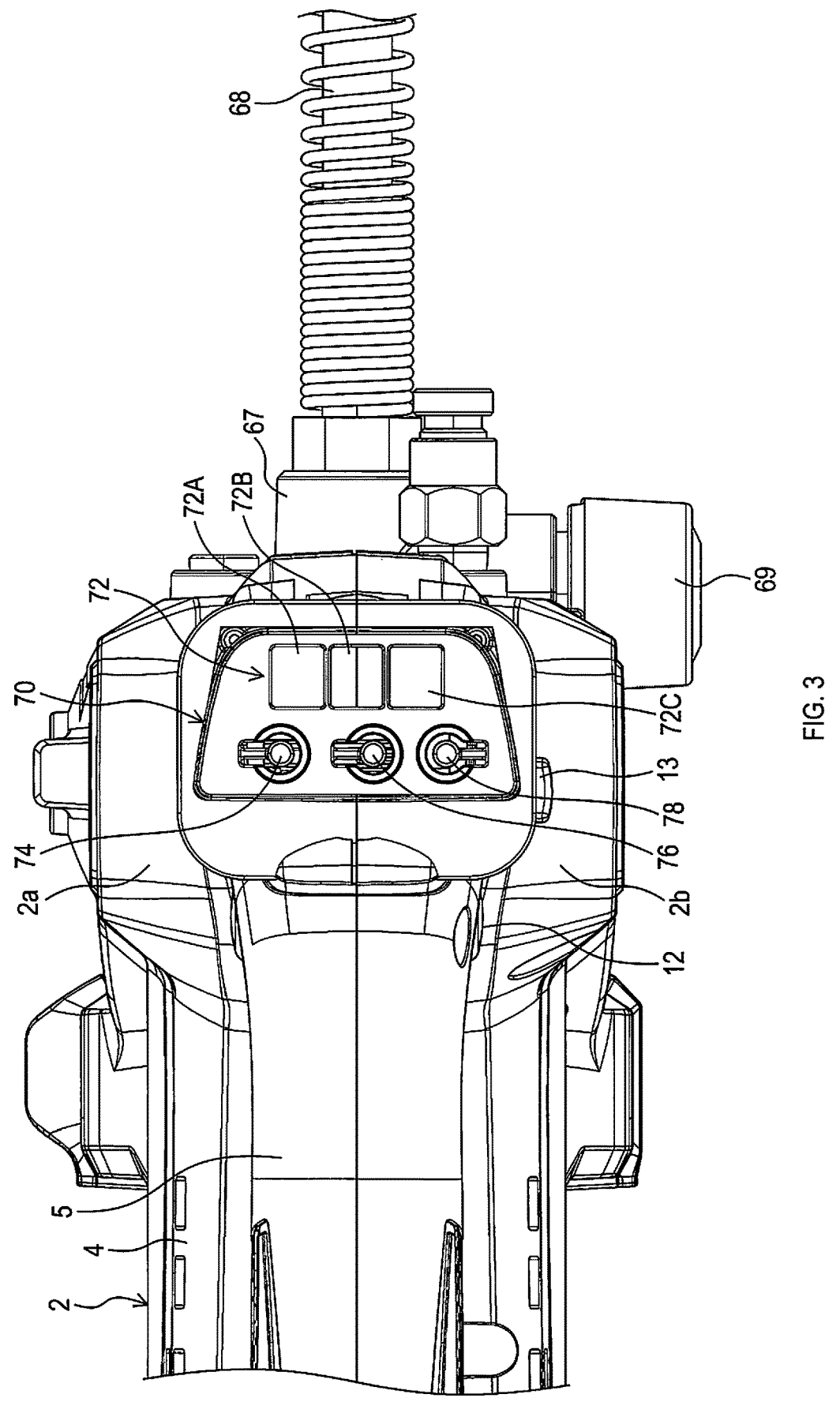
FIG. 3 is a plan view of an operation panel of the electric-powered lubricator.

As shown in FIG. 3, the operation panel 70 includes a display device 72. The display device 72 includes a first display screen 72A, a second display screen 72B, and a third display screen 72C. In the first embodiment, each of the first through third display screens 72A through 72C is a seven-segment display. In another embodiment, each of the first through third display screens 72A through 72C may be other types of display screens including a liquid crystal display (LCD).

The first through third display screens 72A through 72C are arranged in the width direction on the front upper surface of the operation panel 70. The first through third display screens 72A through 72C are covered with a transparent resin plate.

The operation panel 70 includes a mode selection switch 74. In the first embodiment, the mode selection switch 74 is a push-button switch. In another embodiment, the mode selection switch 74 may be other types of manual switches. The mode selection switch 74 is manually operated (or turned on) by the user to select the operating mode of the electric-powered lubricator 1. When the mode selection switch 74 is manually operated, the selected operating mode is displayed on the first through third display screens 72A through 72C.

The operation panel 70 includes a setting change switch 76. In the first embodiment, the setting change switch 76 is a push-button switch. In another embodiment, the setting change switch 76 may be other types of manual switches. The setting change switch 76 is manually operated (or turned on) by the user to change settings of the electric-powered lubricator 1. When the setting change switch 76 is manually operated, the changed settings are displayed on the first through third display screens 72A through 72C.

The operation panel 70 includes a setting confirmation switch 78. In the first embodiment, the setting confirmation switch 78 is a push-button switch. In another embodiment, the setting confirmation switch 78 may be other types of manual switches. The setting confirmation switch 78 is manually operated (or turned on) by the user to confirm the settings of the electric-powered lubricator 1.

In the first embodiment, the mode selection switch 74, the setting change switch 76, and the setting confirmation switch 78 are arranged in the width direction at the rear of the first through third display screens 72A through 72C.

2-1-4. Electrical Configuration of Electric-Powered Lubricator

Figure 4:
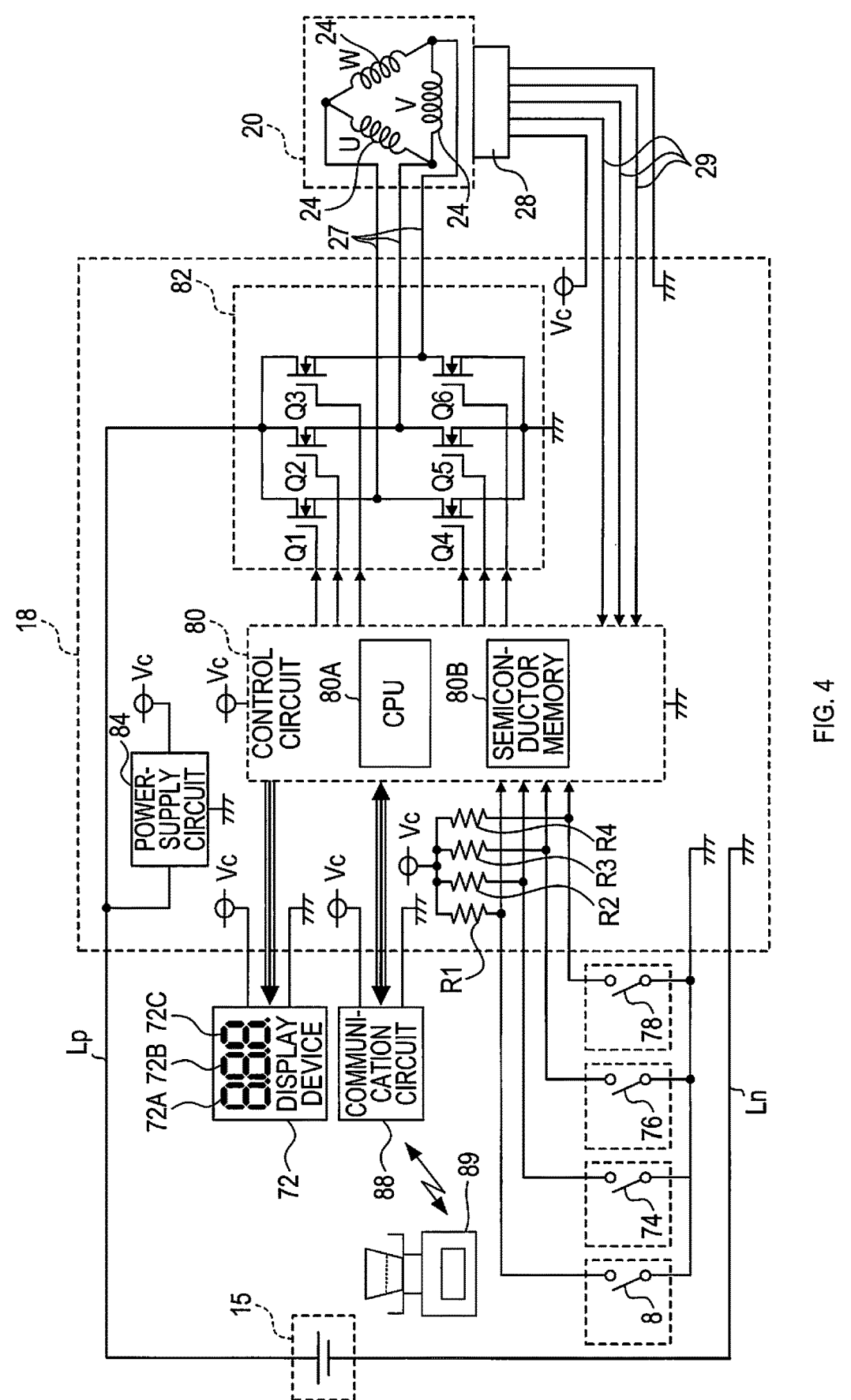
FIG. 4 is a circuit diagram showing an electrical configuration of the electric-powered lubricator.

As shown in FIG. 4, the electric-powered lubricator 1 includes a power-supply line Lp that extends from a positive electrode of the battery pack 15 attached to the battery holder 14 onto the control circuit board 18. The electric-powered lubricator 1 includes a ground line Ln that extends from a negative electrode of battery pack 15 attached to the battery holder 14 to the ground on the control circuit board 18. The battery pack 15 applies its rated voltage between the power-supply line Lp and the ground line Ln.

The electric-powered lubricator 1 includes a power-supply circuit 84. In the first embodiment, the power-supply circuit 84 is on the control circuit board 18. The power-supply circuit 84 is (i) coupled to the power-supply line Lp and the ground on the control circuit board 18 and (ii)

configured to generate a fixed DC voltage (hereinafter, referred to as a power-supply voltage) Vc based on the rated voltage of the battery pack 15.

The electric-powered lubricator 1 includes a control circuit 80. The control circuit 80 operates with the power-supply voltage Vc. The control circuit 80 is configured to switch its operating mode between two or more operating modes including a normal mode and a calibration mode. In the first embodiment, the control circuit 80 is on the control circuit board 18. The control circuit 80 is a microcomputer including a CPU 80A, and a semiconductor memory 80B. The semiconductor memory 80B includes a ROM, a RAM, and a rewritable and non-volatile memory. Examples of the rewritable and non-volatile memory include an EEPROM, a flash memory, a ReRAM, and a FeRAM. Various functions of the control circuit 80 are achieved by the CPU 80A executing a program stored in the semiconductor memory 80. As a result of the CPU 80A executing the program, a method corresponding to this program is performed.

In another embodiment, the control circuit 80 may include an additional microcomputer. In further another embodiment, a part or all of the functions achieved by the CPU 80A may be achieved by one or more electronic components (for example, an integrated circuit). In further another embodiment, the control circuit 80 may be a logic circuit (or a wired logic connection) including two or more electronic components. In further another embodiment, the control circuit 80 may include an ASIC and/or an ASSP. In further another embodiment, the control circuit 80 may include a programmable logic device in which a reconfigurable logic circuit(s) can be built. Examples of the programmable logic device include a FPGA.

The electric-powered lubricator 1 includes a drive circuit 82 configured to drive the electric motor 20. In the first embodiment, the drive circuit 82 is on the control circuit board 18. The drive circuit 82 is a three-phase full-bridge circuit, but is not limited to a three-phase full-bridge circuit. The drive circuit 82 includes first through sixth switches Q1 through Q6. The first through third switches Q1 through Q3 are coupled to the power-supply line Lp on the control circuit board 18 and the aforementioned lead wires 27 of the electric motor 20 so as to serve as high-side switches of the three-phase full-bridge circuit. The fourth through sixth switches Q4 through Q6 are coupled to the lead wires 27 of the electric motor 20 and the ground so as to serve as low-side switches of the three-phase full-bridge circuit.

The first through sixth switches Q1 through Q6 (*i*) respectively receive first through sixth drive control signals from the control circuit 80 and (ii) turn on or off in accordance with the respective drive control signals received. In the first embodiment, the first through sixth drive control signals are pulse width modulated signals. In the first embodiment, the first through sixth switches Q1 through Q6 are semiconductor switches. Examples of the semiconductor switch include a field-effect transistor (FET), a bipolar transistor, and an insulated-gate bipolar transistor (IGBT). In another embodiment, each or at least one of the first through sixth switches Q1 through Q6 may be a mechanical relay.

The electric-powered lubricator 1 includes a communication circuit 88. The communication circuit 88 is configured to establish wireless communication between the control circuit 80 and an external device. In the first embodiment, the communication circuit 88 (*i*) is distinct from the control circuit board 18 and (ii) operates with the power-supply voltage Vc from the control circuit board 18. In another embodiment, the communication circuit 88 may be on the control circuit board 18. In the first embodiment, the external device is a scale 89. The scale 89 is configured (i) to measure a mass of grease dispensed from the electric-powered lubricator 1 and (ii) to transmit to the communication circuit 88 a value corresponding to the measured mass.

The control circuit board 18 is coupled to the display device 72 of the operation panel 70. The display device 72 operates with the power-supply voltage Vc from the control circuit board 18. Also, the display device 72 is configured (i) to receive an indicator control signal from the control circuit 80 and (ii) to display information on the first through third display screens 72A through 72C.

The electric-powered lubricator 1 includes first through fourth pull-up resistors R1 through R4. In the first embodiment, the first through fourth pull-up resistors R1 through R4 are on the control circuit board 18. The first through fourth pull-up resistors R1 through R4 have first ends coupled to the power-supply circuit 84 so as to receive the power-supply voltage Vc from the power-supply circuit 84. The first through fourth pull-up resistors R1 through R4 have second ends respectively coupled to first contacts of the trigger switch 8, the mode selection switch 74, the setting change switch 76, and the setting confirmation switch 78. The trigger switch 8, the mode selection switch 74, the setting change switch 76, and the setting confirmation switch 78 have second contacts coupled to the ground on the control circuit board 18.

When the trigger switch 8, the mode selection switch 74, the setting change switch 76, and the setting confirmation switch 78 are not manually operated (or are turned off), the second ends of the first through fourth pull-up resistors R1 through R4 have voltages as the same level (that is, high level) as the power-supply voltage Vc. When the trigger switch 8, the mode selection switch 74, the setting change switch 76, and the setting confirmation switch 78 are manually operated (or are turned on), the second ends of the first through fourth pull-up resistors R1 through R4 have voltages of the ground level (that is, low level). The first through fourth pull-up resistors R1 through R4 may have the same resistance value. Alternatively, the first through fourth pull-up resistors R1 through R4 may have different resistance values.

The second ends of the first through fourth pull-up resistors R1 through R4 are coupled to the control circuit 80. Thus, the control circuit 80 can detect whether the trigger switch 8, the mode selection switch 74, the setting change switch 76, and the setting confirmation switch 78 are manually operated based on the voltages at the second ends of the first through fourth pull-up resistors R1 through R4. Specifically, if the voltages at the second ends of the first through fourth pull-up resistors R1 through R4 are high level, the control circuit 80 recognizes that the trigger switch 8, the mode selection switch 74, the setting change switch 76, and the setting confirmation switch 78 are not manually operated. If the voltages at the second ends of the first through fourth pull-up resistors R1 through R4 are low level, the control circuit 80 recognizes that the trigger switch 8, the mode selection switch 74, the setting change switch 76, and the setting confirmation switch 78 are manually operated.

The sensor circuit board 28 (more specifically, the first through third rotational position sensors 28A through 28C) operates with the power-supply voltage Vc from the control circuit board 18. The first through third rotational position sensors 28A through 28C (i) are coupled to the control circuit 80 via the aforementioned signal lines 29 and (ii) outputs first through third rotation signals to the control circuit 80. The first through third rotation signals are associated with respective three phases (that is, U-phase, V-phase, and W-phase) of the electric motor 20. The first through third rotation signals are sine wave signals, and respective voltages are reversed from positive to negative or negative to positive each time the rotor 22 rotates by 180 electrical degrees. The first through third rotation signals have phase differences of 60 electrical degrees therebetween.

In another embodiment, the sensor circuit board 28 may be configured to output a rotation detection signal (for example, a pulse signal), instead of the first through third rotation signals, to the control circuit 80 each time the rotor 22 rotates by 60 electrical degrees.

2-1-5. Functional Configuration of Control Circuit

Figure 5:
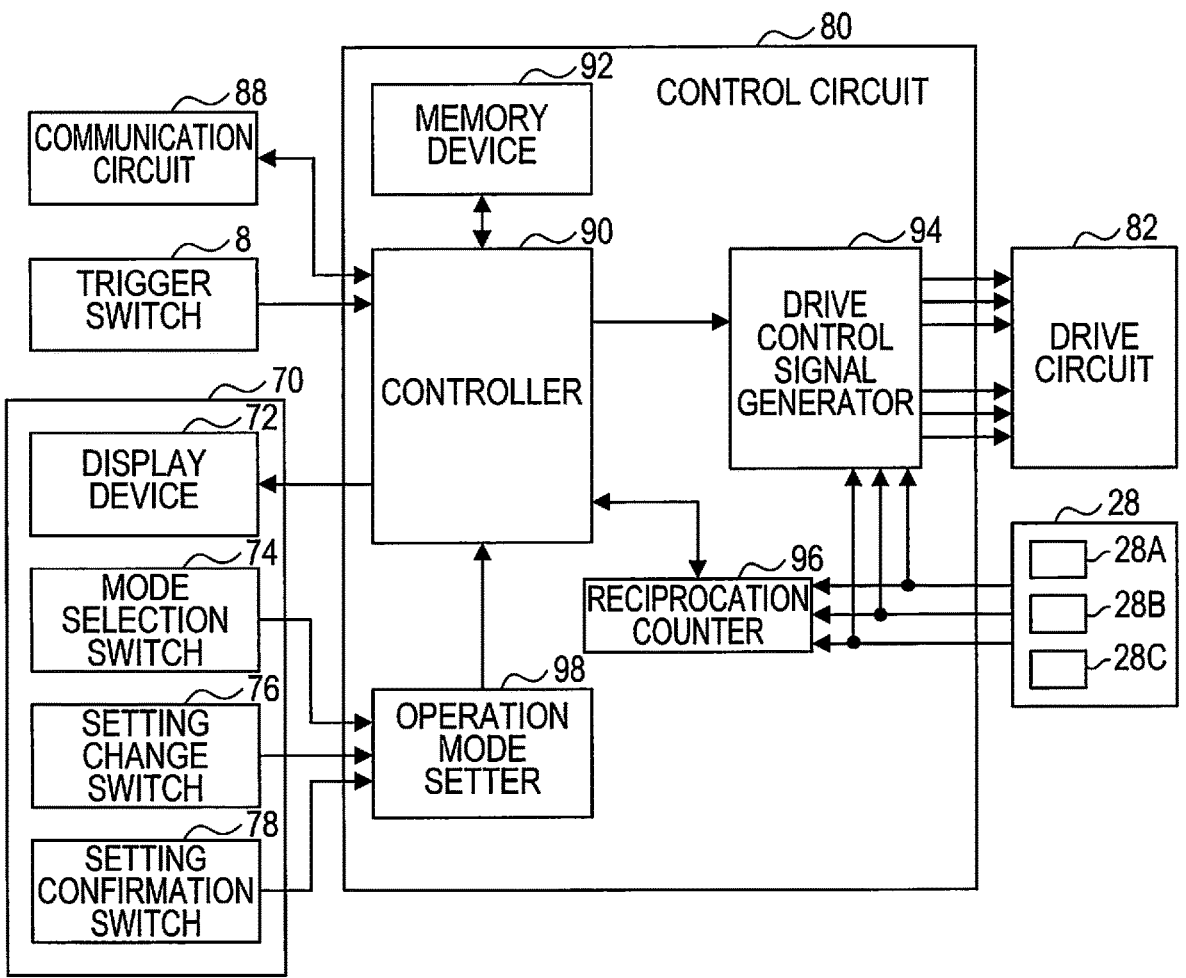
FIG. 5 is a function block diagram of a control circuit in the electric-powered lubricator.

As shown in FIG. 5, the control circuit 80 has functions of a controller 90, a memory device 92, a drive control signal generator 94, a reciprocation counter 96, and an operating mode setter 98. In the first embodiment, the functions of the controller 90, the drive control signal generator 94, the reciprocation counter 96, and the operating mode setter 98 are implemented on the control circuit 80 by software. In another embodiment, at least one function of the controller 90, the drive control signal generator 94, the reciprocation counter 96, and the operating mode setter 98 may be implemented on the control circuit 80 not by software but by hardware (i.e. an electronic circuit).

The controller 90 is configured (i) to receive inputs from the trigger switch 8 and the operating mode setter 98 and (ii) to execute processes related to dispensing of grease based on these inputs.

The controller 90 is also configured to:

(i) output the indicator control signal to the display device 72;

(ii) enable or reset the reciprocation counter 96;

(iii) output a drive command or a stop command to the drive signal generator 94;

(iv) read out data from the memory device 92;

(v) write data to the memory device 92; and (vi) perform data communication with the external device via the communication circuit 88, based on the processes executed by the controller 90.

Detail of the processes executed by the controller 90 will be described later.

The memory device 92 corresponds to a memory area of the rewritable and non-volatile memory in the semiconductor memory 80B. The memory device 92 is configured to output the data retained by the memory device 92 to the control device 90 while retaining the data received from the controller 90. The memory device 92 rewritably stores various values for various operating modes of the control circuit 80. The memory device 92 also stores the current operating mode (more specifically, a value corresponding to the current operating mode) of the control circuit 80 in a rewritable manner.

The drive control signal generator 94 is configured (i) to receive the first through third rotation signals from the first through third rotational position sensors 28A through 28C and (ii) to detect the rotational position of the rotor 22 based on the first through third rotation signals received.

The drive control signal generator 94 is also configured (i) to generate the aforementioned first through sixth drive control signals for rotating the electric motor 20 based on the drive command received from the controller 90 and the rotational position of the rotor 22 detected and (ii) to output, to the drive circuit 82, the first through sixth drive control signals generated. The drive circuit 82 delivers three-phase electric current to the three coils 24 of the stator 21 in accordance with the first through sixth drive control signals to thereby rotate the rotor 22 (and thereby the rotation shaft 30).

The drive control signal generator 94 is also configured (i) to generate the first through sixth drive control signals for stopping the electric motor 20 based on the stop command received from the controller 90 and (ii) to output, to the drive circuit 82, the first through sixth drive control signals. The drive circuit 82 interrupts the three-phase electric current to the three coils 24 of the stator 21 in accordance with the first through sixth drive control signals to thereby stop the rotor 22 (and thereby the rotation shaft 30).

The reciprocation counter 96 is configured (i) to receive the first through third rotation signals from the first through third rotational position sensors 28A through 28C and (ii) to calculate a count of a rotation(s) (or the number of a rotation(s)) of the electric motor 20 based on the first through third rotation signals received. The reciprocation counter 96 is also configured (i) to calculate a count of reciprocation (or the number of reciprocation) of the plunger 50 based on the count of a rotation(s) calculated and (ii) to output, to the controller 90, a value indicating the count of reciprocation calculated.

The operating mode setter 98 is configured (i) to receive inputs from the mode selection switch 74, the setting change switch 76, and the setting confirmation switch 78 and (ii) to indicate whether the respective switches are manually operated to the controller 90 based on the respective inputs.

2-1-6. Summary of Operation of Control Circuit

In the first embodiment, the control circuit 80 configured as above generally operates as follows.

When the control circuit 80 is in the normal mode, the control circuit 80 (*i*) outputs, to the drive circuit 82, the first through sixth drive control signals corresponding to the pulled position of the trigger 9, and (ii) rotates the electric motor 20 at a rotational speed in accordance with the first through sixth drive control signals. The operation of the control circuit 80 as such causes the plunger 50 to reciprocate at a speed corresponding to the pulled position of the trigger 9, and the grease is dispensed (or discharged) from the dispensing port 66A. While the grease is dispensed, the control circuit 80 (*i*) calculates the count of reciprocation of the plunger 50 and (ii) calculates an estimated value based on the count of reciprocation calculated and a reference value stored in the semiconductor memory 80B. The estimated value corresponds to an estimated total mass of grease dispensed from the dispensing port 66A while the trigger 9 is pulled. The reference value corresponds to the mass of grease to be dispensed from the dispensing port 66A per reciprocation of the plunger 50.

When the control circuit 18 is in the calibration mode, the control circuit 80 (*i*) outputs, to the drive circuit 82, the first through sixth drive control signals corresponding to the pulled position of the trigger 9 and (ii) rotates the electric motor 20 at the rotational speed in accordance with the first through sixth drive control signals. While the grease is dispensed, the control circuit 80 calculates the count of reciprocation of the plunger 50. After dispensing of the grease is complete, the control circuit 80 (*i*) calculates a new reference value based on an input value stored in the semiconductor memory 80B and the count of reciprocation calculated and (ii) updates (or overwrites) the reference value stored in the semiconductor memory 80B with the new reference value calculated. The input value corresponds to a measured total mass of grease dispensed.

2-1-7. Detail of Processes Executed by Controller

2-1-7-1. First Main Routine

Figure 6:
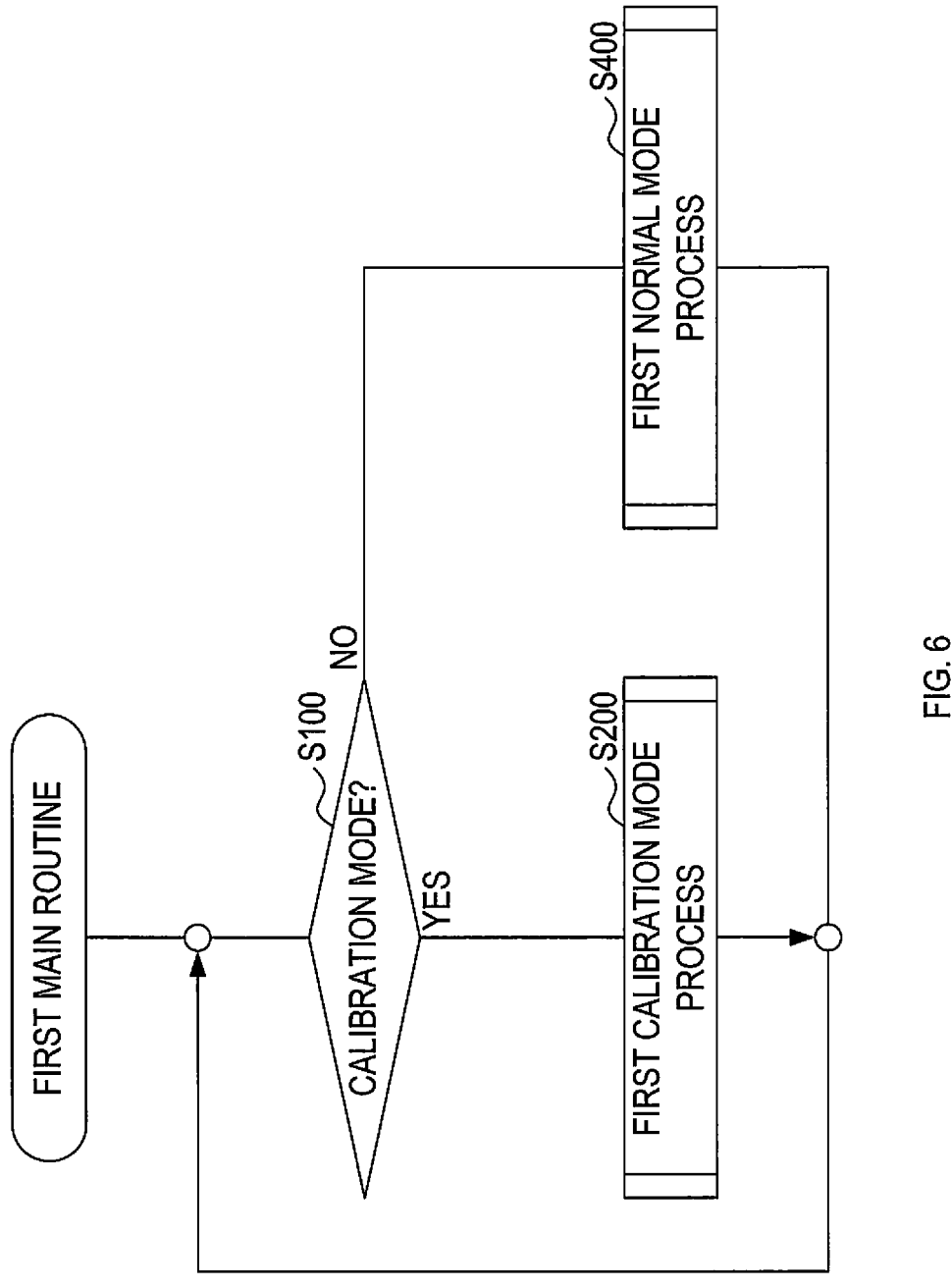
FIG. 6 is a flow chart showing a flow of a first main routine.

The controller 90 is configured to repeatedly execute a first main routine shown in FIG. 6 during the operation of the control circuit 80.

As shown in FIG. 6, the controller 90, firstly in S100 ('S' represents "step"), determines whether the current operating mode of the control circuit 80 stored in the memory device 92 is the calibration mode (S100). When the current operating mode is the calibration mode (S100: YES), the controller 90 executes a first calibration mode process (S200), and then returns to S100. When the current operating mode is not the calibration mode (S100: NO), the controller 90 executes a first normal mode process (S400), and then returns to S100.

2-1-7-2. First Calibration Mode Process

Figure 7:
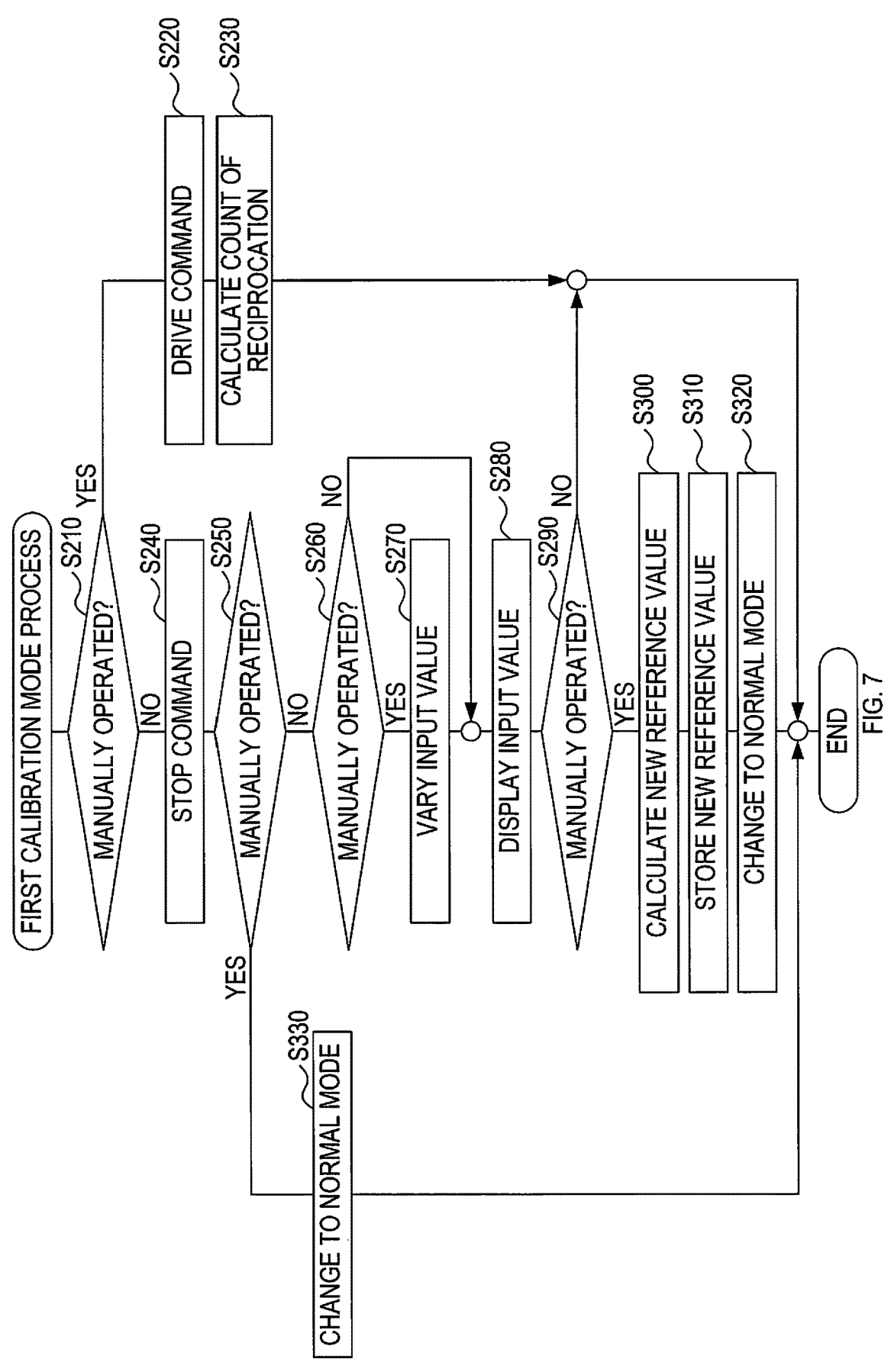
FIG. 7 is a flow chart showing a flow of a first calibration mode process.

As shown in FIG. 7, the controller 90, firstly in S210, determines whether the trigger switch 8 is manually operated.

When the trigger switch 8 is manually operated (S210: YES), the controller 90 proceeds to S220, and outputs the drive command to the drive control signal generator 94 to thereby rotate the electric motor 20. Rotation of the electric motor 20 causes the plunger 50 to reciprocate up and down within the pump 60, and the grease is dispensed from the dispensing port 66A.

In subsequent S230, the controller 90 enables the reciprocation counter 96 so as to calculate the count of reciprocation of the plunger 50, and ends the first calibration mode process.

In S210, when the trigger switch 8 is not manually operated (S210: NO), the controller 90 proceeds to S240, and outputs the stop command to the drive control signal generator 94 to thereby stop the electric motor 20. Stopping of the electric motor 20 stops the reciprocation of the plunger 50, and also stops dispensing of the grease from the dispensing port 66A.

In subsequent S250, the controller 90 determines whether the mode selection switch 74 is manually operated. When the mode selection switch 74 is manually operated (S250: YES), the controller 90 proceeds to S330 to change the current operating mode of the control circuit 80 stored in the memory device 92 to the normal mode, and ends the first calibration mode process.

When the mode selection switch 74 is not manually operated (S250: NO), the controller 90 proceeds to S260 to determine whether the setting change switch 76 is manually operated.

When the setting change switch 76 is not manually operated (S260: NO), the controller 90 proceeds to S280. When the setting change switch 76 is manually operated (S260: YES), the controller 90 proceeds to S270. In S270, the controller 90 varies the input value stored in the memory device 92 in accordance with the manual operation performed on the setting change switch 76. The user manually operates the setting change switch 76 in accordance with the input value corresponding to the measured total mass of grease dispensed.

In subsequent S280, the controller 90 outputs, to the display device 72, the indicator control signal for displaying the input value stored in the memory device 92 on the first through third display screens 72A through 72C to thereby display the input value on the display device, and proceeds to S290.

In S290, the controller 90 determines whether the setting confirmation switch 78 is manually operated. When the setting confirmation switch 78 is not manually operated (S290: NO), the controller 90 ends the first calibration mode process.

When the setting confirmation switch 78 is manually operated (S290: YES), the controller 90 proceeds to S300 to calculate a new reference value based on (i) the input value stored in the memory device 92 and (ii) the count of reciprocation of the plunger 50 calculated in S230 up to that point. More specifically, the new reference value is calculated by the controller 90 dividing the input value by the count of reciprocation.

In subsequent S310, the controller 90 updates (or overwrites) the reference value stored in the memory device 92 with the new reference value calculated, and proceeds to S320. In S320, the controller 90 changes the current operating mode stored in the memory device 92 from the calibration mode to the normal mode, and ends the first calibration mode process.

2-1-7-3. First Normal Mode Process

Figure 8:
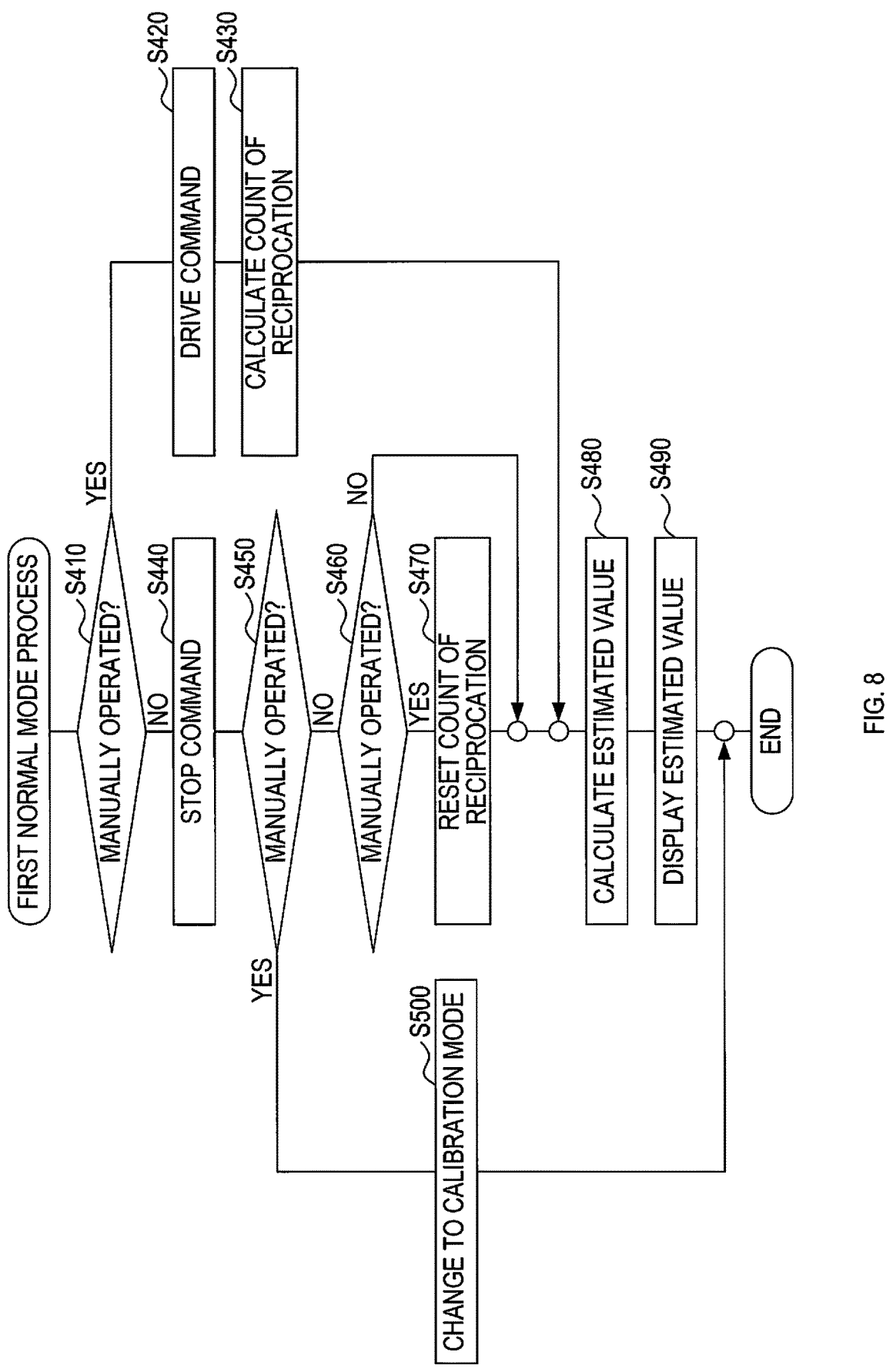
FIG. 8 is a flow chart showing a flow of a first normal mode process.

As shown in FIG. 8, the controller 90, firstly in S410, determines whether the trigger switch 8 is manually operated.

When the trigger switch 8 is manually operated (S410: YES), the controller 90 proceeds to S420 to output the drive command to the drive control signal generator 94 to thereby rotate the electric motor 20. Rotation of the electric motor 20 causes the plunger 50 to reciprocate up and down within the pump 60, and the grease is dispensed from the dispensing port 66A.

In subsequent S430, the controller 90 enables the reciprocation counter 96 so as to calculate the count of reciprocation of the plunger 50, and proceeds to S480.

In S410, when the trigger switch 8 is not manually operated (S410: NO), the controller 90 proceeds to S440 to output the stop command to the drive control signal generator 94 to thereby stop the electric motor 20. Stopping of the electric motor 20 stops the reciprocation of the plunger 50, and dispensing of the grease from the dispensing port 66A is also stopped.

In subsequent S450, the controller 90 determines whether the mode selection switch 74 is manually operated. When the mode selection switch 74 is manually operated (S450: YES), the controller 90 proceeds to S500 to change the current operating mode of the control circuit 80 stored in the memory device 92 to the calibration mode, and ends the first normal mode process.

When the mode selection switch 74 is not manually operated (S450: NO), the controller 90 proceeds to S460 to determine whether the setting change switch 76 is manually operated. When the setting change switch 76 is not manually operated (S460: NO), the controller 90 proceeds to S480. When the setting change switch 76 is manually operated (S460: YES), the controller 90 proceeds to S470 to reset the reciprocation counter 96, and proceeds to S480. When the reciprocation counter 96 is reset, the count of reciprocation calculated is set to zero.

In S480, the controller 90 calculates the estimated value. More specifically, the estimated value is calculated by the controller 90 multiplying (i) the reference value stored in the memory device 92 and (ii) the count of reciprocation calculated.

In subsequent S490, the controller 90 outputs, to the display device 72, the indicator control signal for displaying the calculated estimated value on the first through third display screens 72A through 72C to thereby display the estimated value on the display device 72, and ends the first normal mode process.

2-1-8. Technical Effect of First Embodiment

In the electric-powered lubricator 1 of the first embodiment, the user can switch the operating mode of the control circuit 80 between the normal mode and the calibration mode.

In the normal mode, the estimated value of the grease dispensed from the dispensing port 66A is displayed on the display device 72. Accordingly, the user can manually adjust a dispensed amount of grease while checking the estimated value.

In the calibration mode, the grease is actually dispensed from the dispensing port 66A, and a new reference value is calculated based on (i) the input value corresponding to a measured total mass of grease and (ii) the count of reciprocation of the plunger 50.

Accordingly, the user can calibrate the reference value stored in the electric-powered lubricator 1 in accordance with types of grease used and the surrounding environment. As a result, the user can more accurately identify the dispensed amount of grease in the normal mode, and therefore more accurately perform manual adjustments.

2-1-9. Correspondence Between Terms

In the first embodiment, the trigger switch 8 corresponds to an example of the first manual switch in Overview of Embodiments. The semiconductor memory 80 corresponds to an example of the memory device in Overview of Embodiments. The setting change switch 76 corresponds to an example of the second manual switch in Overview of Embodiments. The mode selection switch 74 corresponds to an example of the fifth manual switch in Overview of Embodiments.

2-1-10. First Variation

The electric-powered lubricator 1 of a first variation differs from the electric-powered lubricator 1 of the first embodiment in that a second calibration mode process is executed in place of the first calibration mode process. The second calibration mode process corresponds to the first calibration mode process with some partial modifications. Accordingly, the following description focuses only on the portions modified from the first calibration mode process.

2-1-10-1. Second Calibration Mode Process

The second calibration mode process differs from the first calibration mode process in that the controller 90 communicates with the aforementioned scale 89, and automatically acquires the input value from the scale 89.

Figure 9:
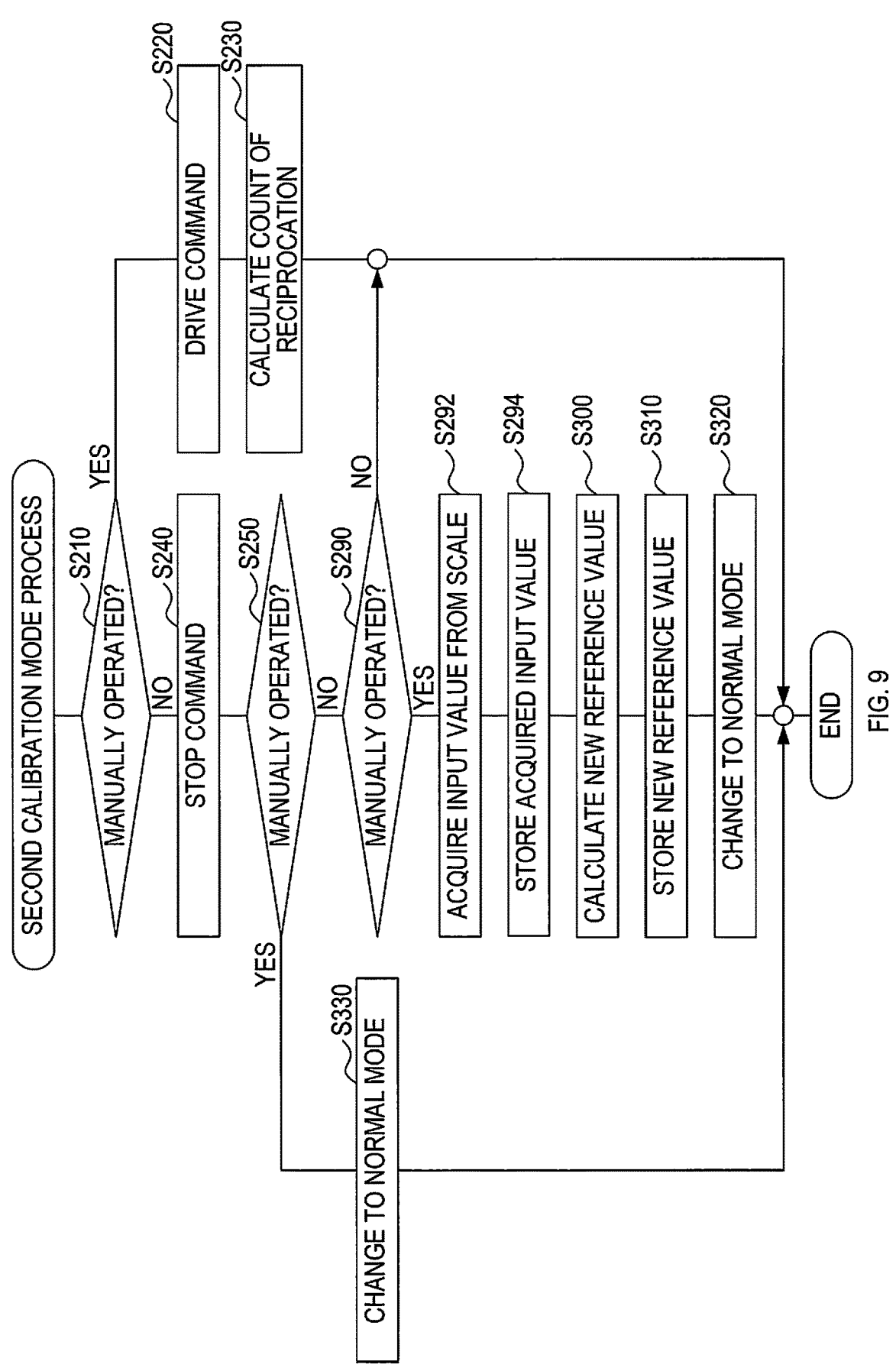
FIG. 9 is a flow chart showing a flow of a second calibration mode process.

As shown in FIG. 9, the second calibration mode process differs from the first calibration mode process in that S260 through S280 are removed and S292 and S294 are added.

Specifically, in S250, when the mode selection switch 74 is not manually operated (S250: NO), the controller 90 proceeds to S290 to determine whether the setting confirmation switch 78 is manually operated. When the setting confirmation switch 78 is manually operated (S290: YES), the controller 90 proceeds to S292.

In S292, the controller 90 communicates with the scale 89 via the communication circuit 88, and acquires, from the scale 89, an input value corresponding to the total mass of grease measured by the scale 89. In subsequent S294, the controller 90 stores the acquired input value in the memory device 92.

In subsequent S300, the controller 90 calculates a new reference value based on (i) the input value stored in the memory device 92 in S294 and (ii) the count of reciprocation calculated in S230 up to that point.

2-1-10-2. Technical Effect of First Variation

The electric-powered lubricator 1 of the first variation can automatically acquire the input value from the scale 89. Accordingly, the user is not required to manually enter the input value to the electric-powered lubricator 1, and the workload of the user required for calibration of the reference value can be reduced.

2-1-11. Second Variation

The electric-powered lubricator 1 of the second variation differs from the electric-powered lubricator 1 of the first embodiment in that a third calibration mode process is executed in place of the first calibration mode process. The third calibration mode process corresponds to the first calibration mode process with some partial modifications. Accordingly, the following description focuses only on the portions modified from the first calibration mode process.

2-1-11-1. Third Calibration Mode Process

Figure 10:
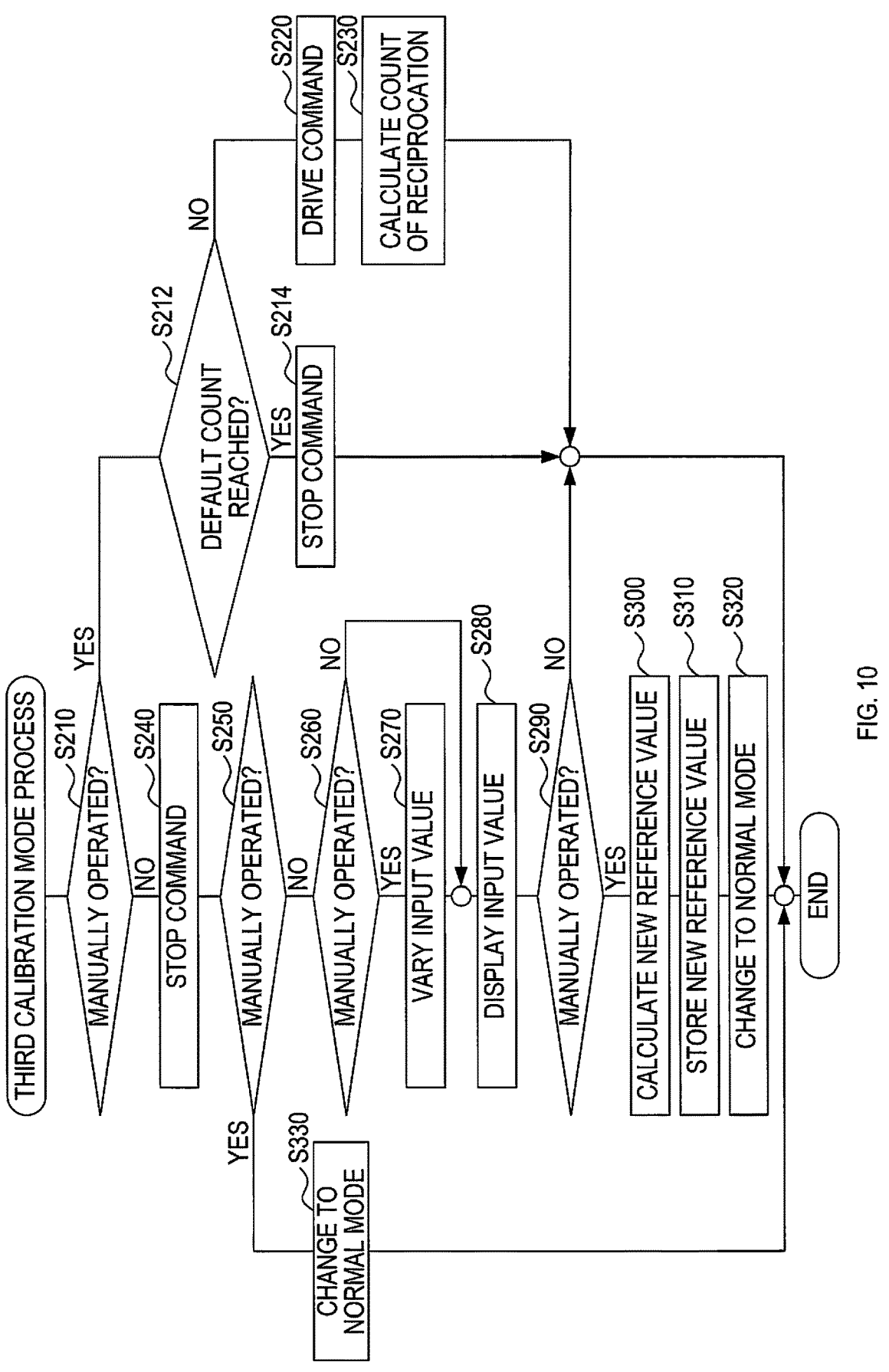
FIG. 10 is a flow chart showing a flow of a third calibration mode process.

The third calibration mode process differs from the first calibration mode process in that the count of reciprocation of the plunger 50 is limited. As shown in FIG. 10, the third calibration mode process differs from the first calibration mode process in that S212 and S214 are added.

Specifically, in S210, when the trigger switch 8 is manually operated (S210: YES), the controller 90 proceeds to S212 to determine whether the count of reciprocation of the plunger 50 calculated in S230 up to that point has reached a default count. The default count may be the count adapted to acquire the input value suitable for updating the reference value, but is not limited to the count as such.

When the count of reciprocation of the plunger 50 has not reached the default count (S212: NO), the controller 90 proceeds to S220.

When the count of reciprocation of the plunger 50 has reached the default count (S212: YES), the controller 90 proceeds to S214 to output the stop command to the drive control signal generator 94 to thereby stop the electric motor 20, and stops dispensing of the grease from the dispensing port 66A.

2-1-11-2. Technical Effect of Second Variation

In the electric-powered lubricator 1 of the second variation, since the count of reciprocation of plunger 50 in the calibration mode is limited, it is not necessary for the user to manually adjust the amount of grease dispensed from the dispensing port 66A for calibration of the reference value.

Accordingly, the workload of the user required for calibration of the reference value can be reduced.

2-1-12. Third Variation

The electric-powered lubricator 1 of the third variation differs from the electric-powered lubricator 1 of the first embodiment in that a fourth calibration mode process is executed in place of the first calibration mode process. The fourth calibration mode process corresponds to the first calibration mode process with some partial modifications. Accordingly, the following description focuses only on the portions modified from the first calibration mode process.

2-1-12-1. Fourth Calibration Mode Process

The fourth calibration mode process corresponds to a combination of the second calibration mode process with the third calibration mode process.

Figure 11:
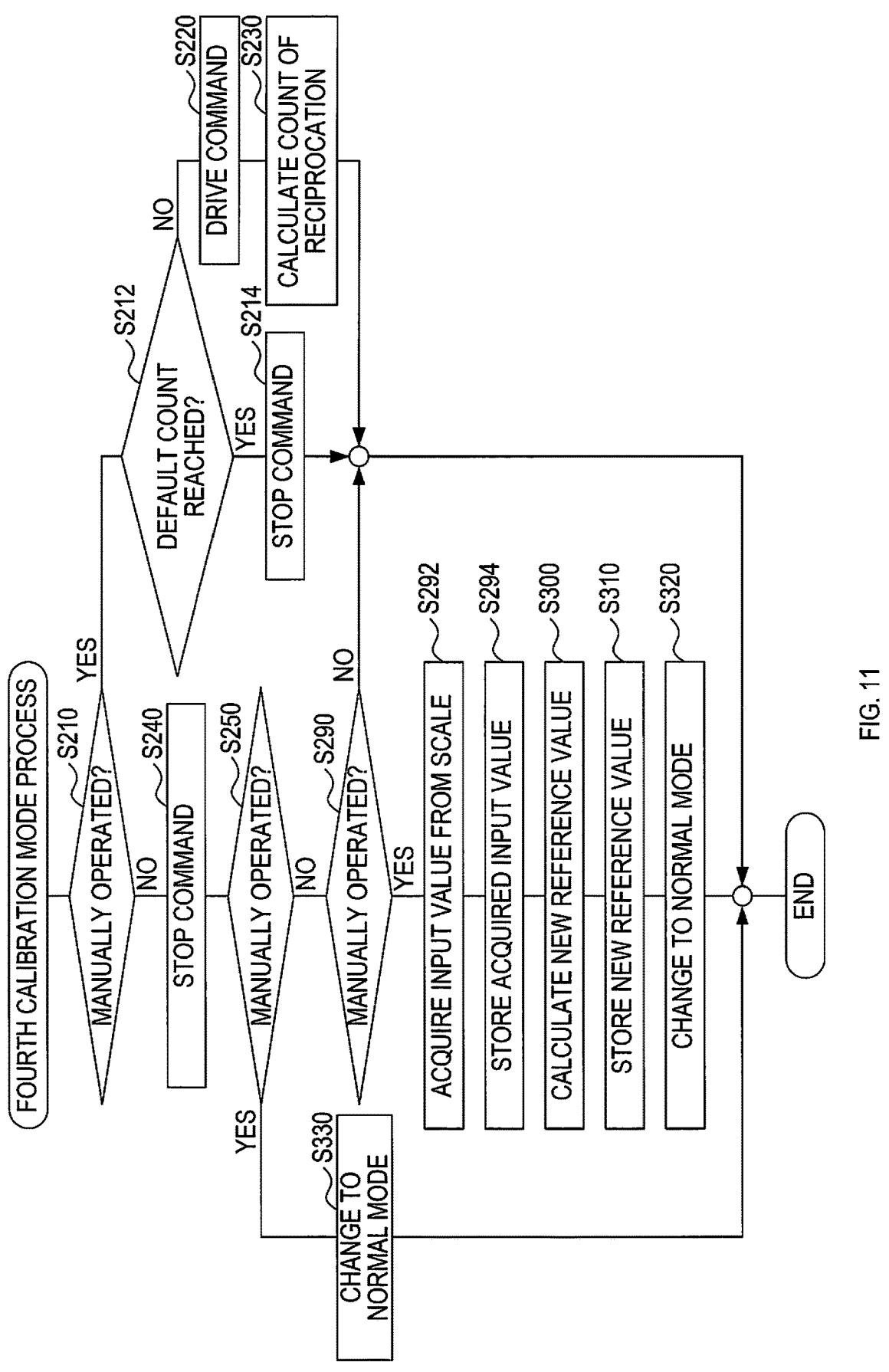
FIG. 11 is a flow chart showing a flow of a fourth calibration mode process.

As shown in FIG. 11, the fourth calibration mode process differs from the first calibration mode process in that S260 through S280 are removed, and S292 through S294 of the second calibration mode process and S212 through S214 of the third calibration mode process are added.

2-1-12-2. Technical Effect of Third Variation

In the electric-powered lubricator 1 of the third variation, the user is not required to manually adjust the amount of grease discharged from the dispensing port 66A for calibration of the reference value, or manually enter the input value to the electric-powered lubricator 1. Accordingly, the workload of the user required for calibration of the reference value can be significantly reduced.

2-1-13. Fourth Variation

The electric-powered lubricator 1 of the fourth variation differs from the electric-powered lubricator 1 of the first embodiment in that a second normal mode process is executed in place of the first normal mode process. The second normal mode process corresponds to the first normal mode process with some partial modifications. Accordingly, the following description focuses only on the portions modified from the first normal mode process.

2-1-13-1. Second Normal Mode Process

The second normal mode process differs from the first normal mode process in that the user can set the amount of grease to be dispensed from the dispensing port 66A in advance.

Figure 12:
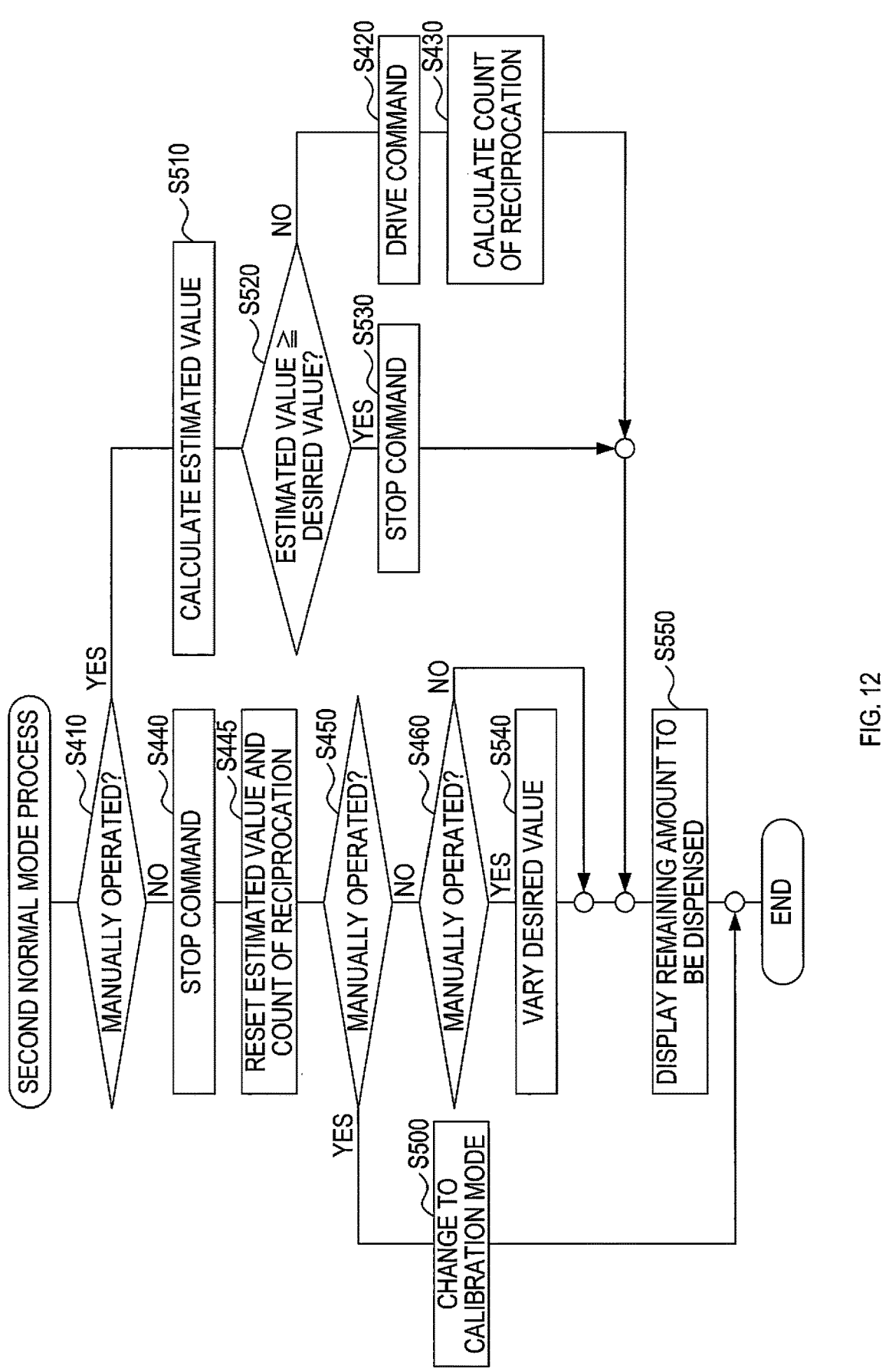
FIG. 12 is a flow chart showing a flow of a second normal mode process.

As shown in FIG. 12, the second normal mode process differs from the first normal mode process in that S445, S510 through S550 are added, and S470 through S490 are removed.

Specifically, in S410, when the trigger switch 8 is manually operated (S410: YES), the controller 90 proceeds to S510. In S510, the controller 90 calculates an estimated value. More specifically, the estimated value is calculated by the controller 90 multiplying (i) the reference value stored in the memory device 92 and (ii) the count of reciprocation of the plunger 50 calculated in S430 up to that point.

In subsequent S520, the controller 90 determines whether the estimated value calculated in S510 has reached a desired value (or a target value). The desired value corresponds to a desired total mass (or a target total mass) of grease to be dispensed from the dispensing port 66A. The desired value is manually entered in advance by the user via the setting change switch 76, and stored in the memory device 92.

When the estimated value has not reached the desired value (S520: NO), the controller 90 proceeds to S550 via S420 and S430.

In S520, when the estimated value has reached the desired value (S520: YES), the controller 90 proceeds to S530 to output the stop command to the drive control signal generator 94 to thereby stop the electric motor 20, and proceeds to S550. As a result, the amount of grease dispensed from the dispensing port 66A is automatically controlled so that the estimated value reaches the desired value without the user adjusting the pulled position of the trigger 9.

In S550, the controller 90 causes the display device 72 to display the remaining amount to be dispensed. More specifically, the remaining amount to be dispensed is calculated by the controller 90 subtracting the estimated value calculated in S510 from the desired value. The controller 90 outputs, to the display device 72, the indicator control signal for displaying the calculated remaining amount on the first through third display screens 72A through 72C to thereby display the remaining amount on the display device 72. When processing of S550 is complete, the controller 90 ends the second normal mode process.

In S410, when the trigger switch 8 is not manually operated (S410: NO), the controller 90 proceeds to S440 to output the stop command to the drive control signal generator 94 to thereby stop the electric motor 20. In subsequent S445, the controller 90 resets (i) the estimated value calculated in S510 and (ii) the count of reciprocation calculated in S430 up to that point to zero, and proceeds to S450.

In S450, when the mode selection switch 74 is not manually operated (S450: NO), the controller 90 proceeds to S460. In S460, when the setting change switch 76 is not manually operated (S460: NO), the controller 90 proceeds to S550. When the setting change switch 76 is manually operated (S460: YES), the controller 90 proceeds to S540 to vary the desired value stored in the memory device 92 in accordance with the manual operation made to the setting change switch 76, and proceeds to S550. The user manually operates the setting change switch 76 based on the desired value to be manually entered to the electric-powered lubricator 1.

In S540, the controller 90 may output, to the display device 72, the indicator control signal for displaying the desired value stored in the memory device 92 on the first through third display screens 72A through 72C to thereby display the desired value on the display device 72.

2-1-13-2. Technical Effect of Fourth Variation

In the electric-powered lubricator 1 of the fourth variation, the user can set the desired value in advance to limit the amount of grease to be dispensed from the dispensing port 66A in the normal mode. The user can also identify the remaining amount to be dispensed via the display device 72.

2-2. Second Embodiment

The electric-powered lubricator 1 of the second embodiment corresponds to the electric-powered lubricator 1 of the first embodiment with some partial modifications in operation of the calibration mode.

Specifically, in the calibration mode of the second embodiment, the input value is a fixed value set in advance, and corresponds to a default total mass of grease. Accordingly, the input value is not entered to the electric-powered lubricator 1 via manual operation of the setting change switch 76 or communication between the electric-powered lubricator 1 and the scale 89.

Instead, the user, while measuring the total mass of grease dispensed from the dispensing port 66A by the scale 89, manually operates the trigger 9, to thereby dispense a preset amount of grease from the dispensing port 66A.

The electric-powered lubricator 1 in the second embodiment differs from the electric-powered lubricator 1 in the first embodiment in that a fifth calibration mode process is executed in place of the first calibration mode process. The fifth calibration mode process corresponds to the first calibration mode process with some partial modifications. Accordingly, the following description focuses only on the portions modified from the first calibration mode process.

2-2-1. Fifth Calibration Mode Process

Figure 13:
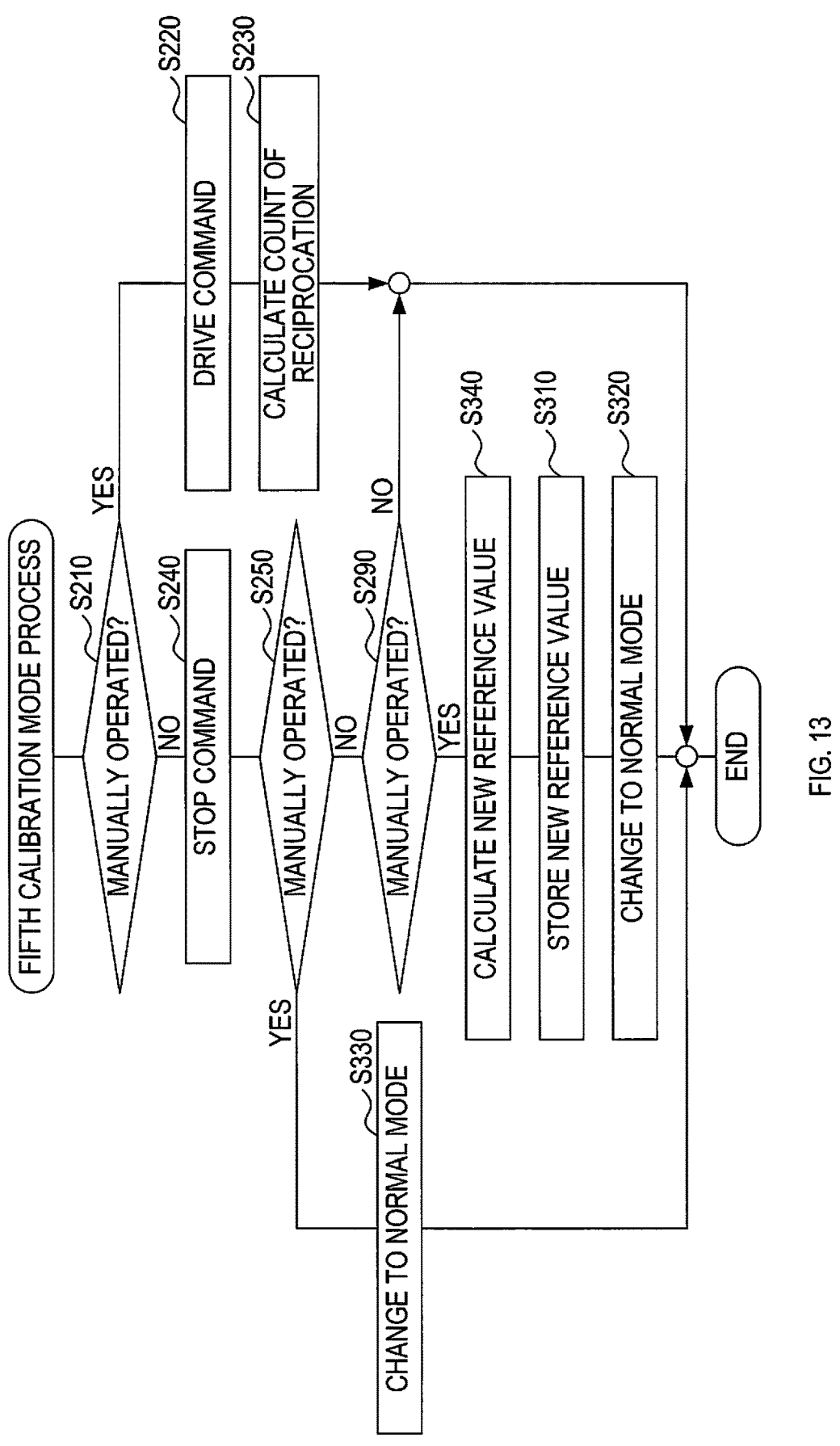
FIG. 13 is a flow chart showing a flow of a fifth calibration mode process.

As shown in FIG. 13, the fifth calibration mode process differs from the first calibration mode process in that S260 through S280 and S300 are removed, and S340 is added.

Specifically, in S250, when the mode selection switch 74 is not manually operated (S250: NO), the controller 90 proceeds to S290. In S290, when the setting confirmation switch 78 is manually operated (S290: YES), the controller 90 proceeds to S340 to calculate a new reference value based on (i) the input value stored in the memory device 92 and (ii) the count of reciprocation of the plunger 50 calculated in S230 up to that point. In the fifth calibration mode process, the user manually operates the setting confirmation switch 78 so that the control device 90 recognizes that dispensing of grease for calibration of the reference value has been complete.

When the new reference value is calculated, the controller 90 proceeds to S310.

2-2-2. Technical Effect of Second Embodiment

The electric-powered lubricator 1 of the second embodiment can calculate a new reference value without the user manually entering the input value to the electric-powered lubricator 1.

2-2-3. Fifth Variation

The electric-powered lubricator 1 of the fifth variation differs from the electric-powered lubricator 1 of the second embodiment in that a sixth calibration mode process is executed in place of the fifth calibration mode process. The sixth calibration mode process corresponds to the fifth calibration mode process with some partial modifications. Accordingly, the following description focuses only on the portions modified from the fifth calibration mode process.

2-2-3-1. Sixth Calibration Mode Process

Figure 14:
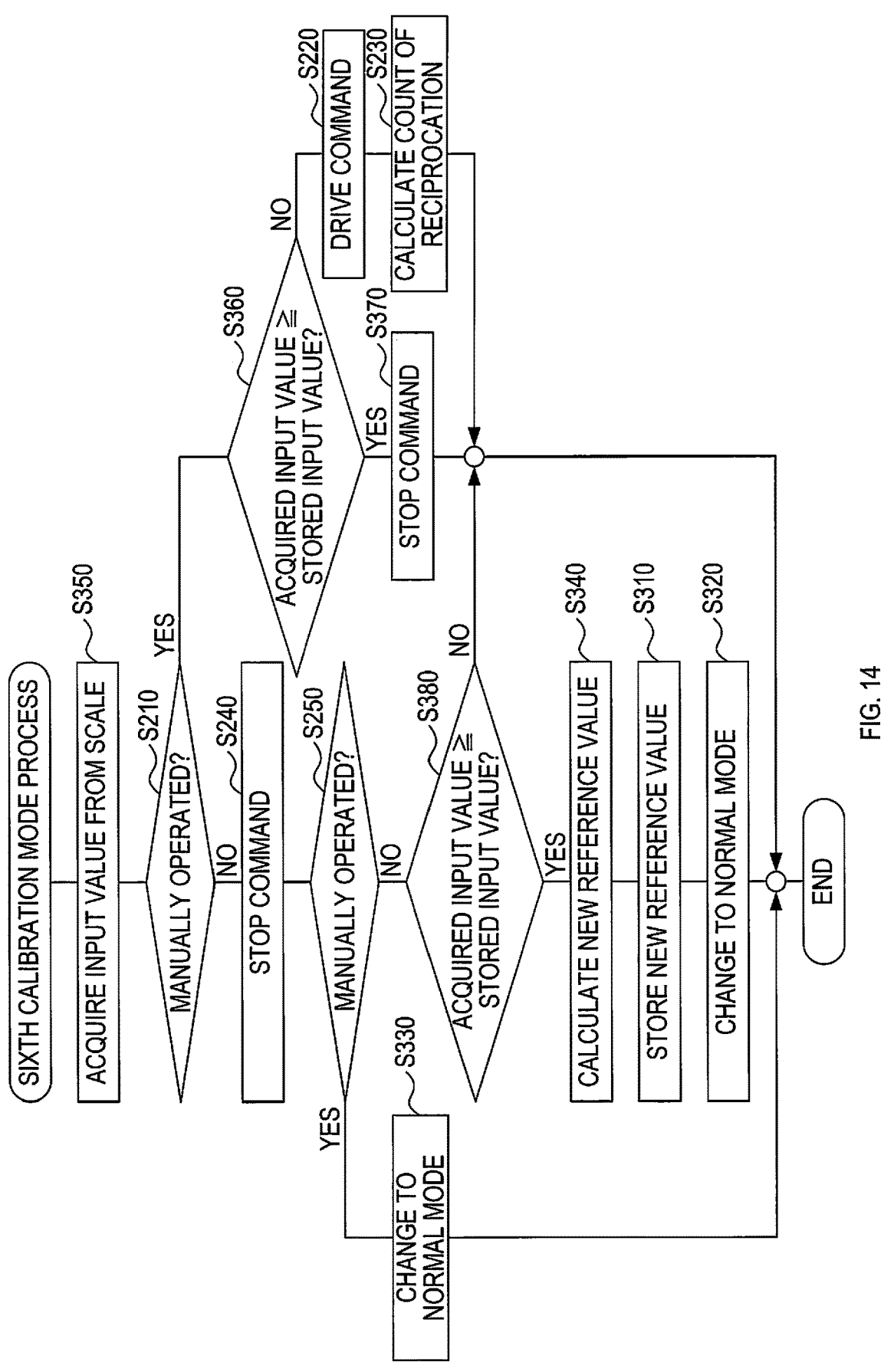
FIG. 14 is a flow chart showing a flow of a sixth calibration mode process.

As shown in FIG. 14, the sixth calibration mode process differs from the fifth calibration mode process in that S350 through S380 are added, and S290 is removed.

Specifically, the controller 90, firstly in S350, acquires the input value from the scale 89 via the communication circuit 88, and proceeds to S210.

In S210, when the trigger switch 8 is manually operated (S210: YES), the controller 90 proceeds to S360 to determine whether the input value acquired in S350 has reached the input value stored in the memory device 92. In the fifth variation, the input value stored in the memory device 92 is a fixed value set in advance, and corresponds to a default total mass of grease.

When the acquired input value has not reached the stored input value (S360: NO), the controller 90 proceeds to S220.

When the acquired input value has reached the stored input value (S360: YES), the controller 90 proceeds to S370 to output the stop command to the drive control signal generator 94 to thereby stop the electric motor 20, and ends the sixth calibration mode process.

In S210, when the trigger switch 8 is not manually operated (S210: NO), the controller 90 proceeds to S250 via S240.

In S250, when the mode selection switch 74 is not manually operated (S250: NO), the controller 90 proceeds to S380, and, similar to S360, determines whether the input value acquired in S350 has reached the stored input value.

When the acquired input value has reached the stored input value (S380: YES), the controller 90 proceeds to S340. When the acquired input value has not reached the stored input value (S380: NO), the controller 90 ends the sixth calibration mode process.

2-2-3-2. Technical Effect of Fifth Variation

The electric-powered lubricator 1 of the fifth variation can accurately dispense a preset amount of grease from the dispensing port 66A in the calibration mode, without manual adjustment by the user. Accordingly, the workload of the user required for calibration of the reference value can be significantly reduced.

2-3. Third Embodiment

The electric-powered lubricator 1 of the third embodiment differs from the electric-powered lubricator 1 of the first embodiment in that a second main routine is executed in place of the first main routine. The second main routine corresponds to the first main routine with some partial modifications. Accordingly, the following description focuses only on the portions modified from the first main routine.

2-3-1. Second Main Routine

The second main routine differs from the first main routine in that the operating mode of the control circuit 80 can be switched not only to the calibration mode and the normal mode, but also to a setting change mode.

Figure 15:
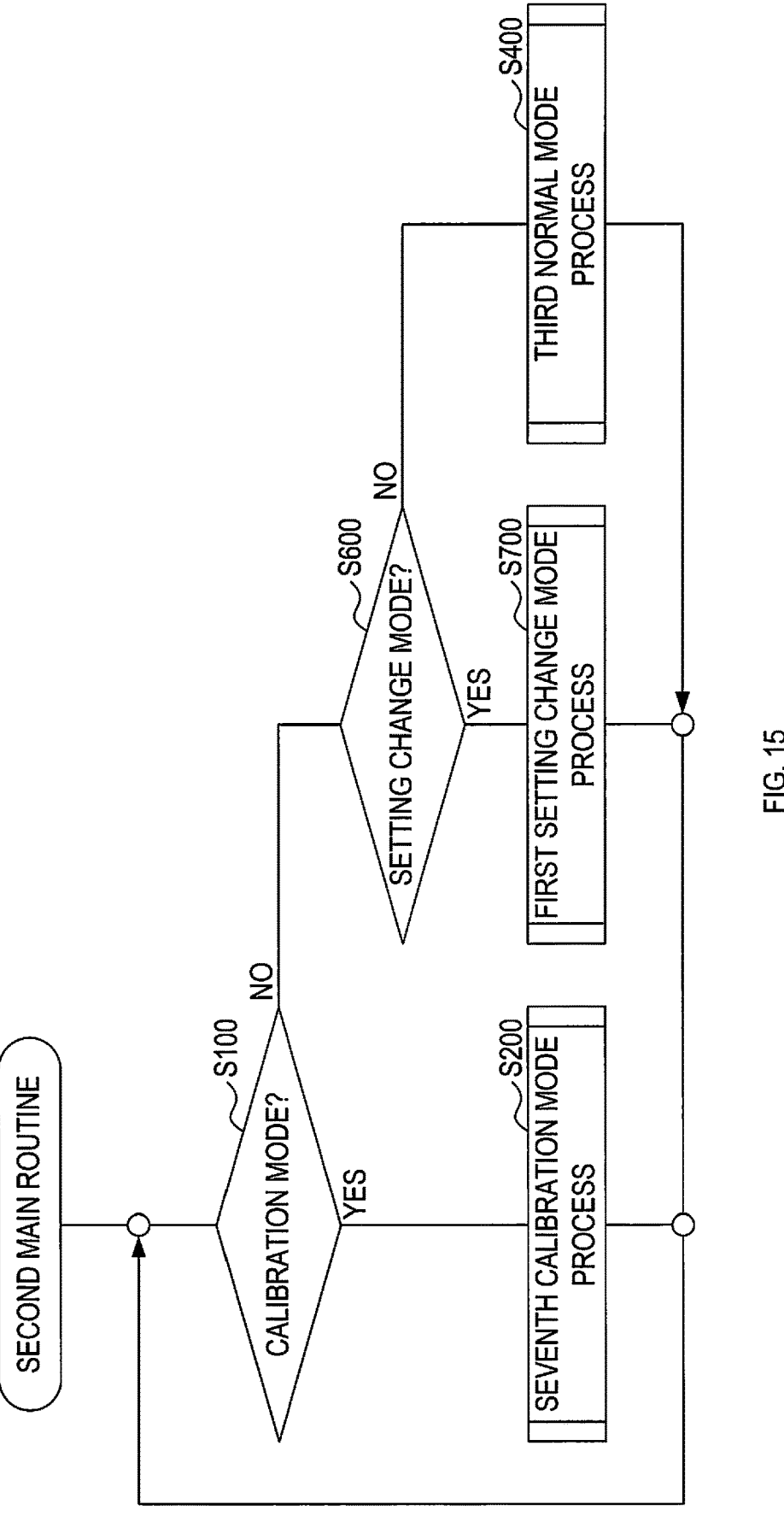
FIG. 15 is a flow chart showing a flow of a second main routine.

As shown in FIG. 15, the second main routine differs from the first main routine in that S600 and S700 are added. Moreover, the second main routine differs from the first main routine in that a seventh calibration mode process is executed in S200 in place of the first calibration mode process, and a third normal mode process is executed in S400 in place of the first normal mode process.

Specifically, in S100, when the current operating mode stored in the memory device 92 is not the calibration mode (S100: NO), the controller 90 proceeds to S600. In S600, the controller 90 determines whether the current operating mode stored in the memory device 92 is the setting change mode.

When the current operating mode is the setting change mode (S600: YES), the controller 90 proceeds to S700 to execute a first setting change mode process, and returns to S100. When the current operating mode is not the setting change mode (S600: NO), the controller 90 proceeds to S400.

In the second main routine in another embodiment, any one of the first through sixth calibration mode processes or the later-described eighth calibration mode process may be executed in S200 in place of the seventh calibration mode process, and the first normal mode process or the second normal mode process may be executed in S400 in place of the third normal mode process.

2-3-2. First Setting Change Mode Process

Figure 16:
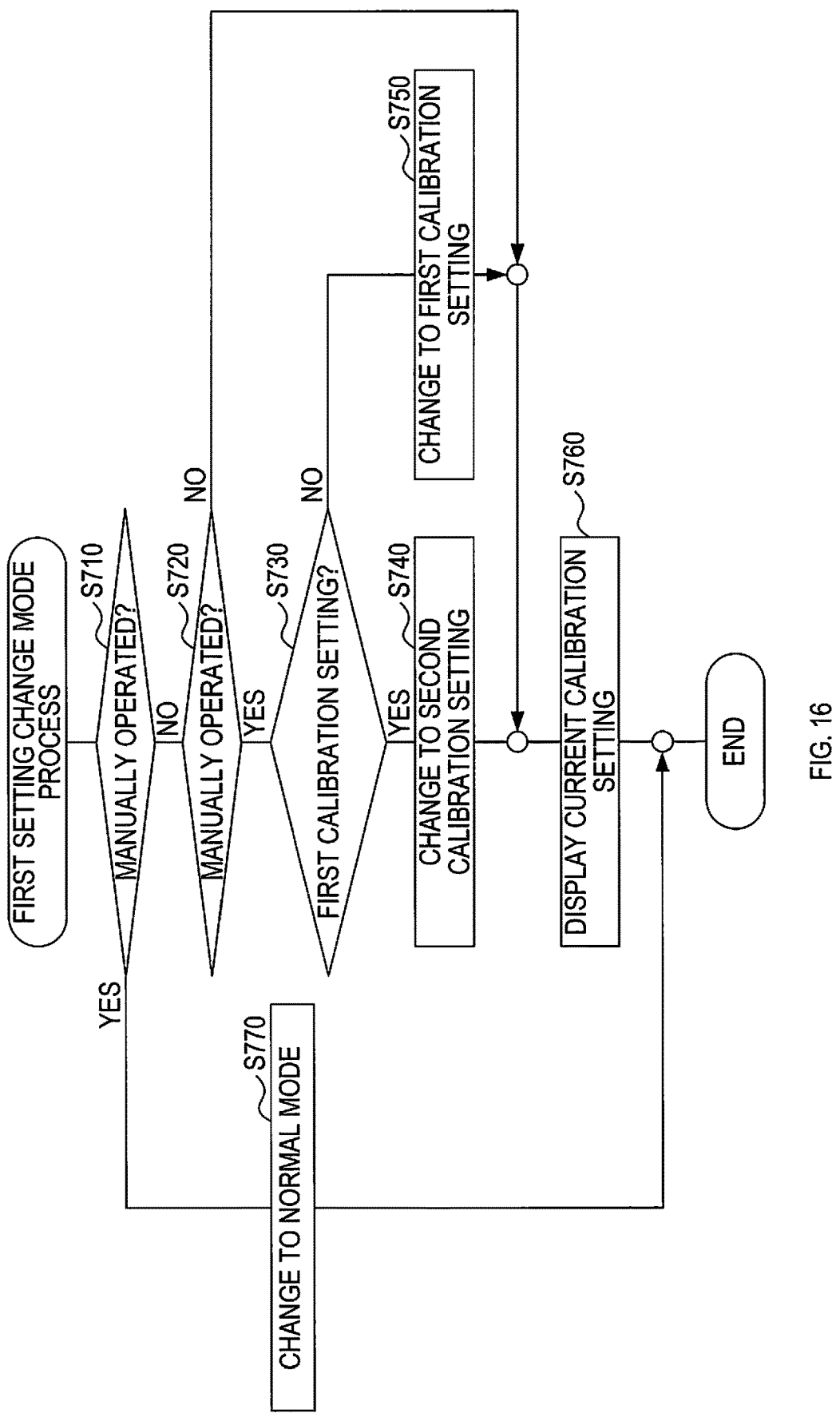
FIG. 16 is a flow chart showing a flow of a first setting change mode process.

As shown in FIG. 16, the controller 90, firstly in S710, determines whether the mode selection switch 74 is manually operated. When the mode selection switch 74 is manually operated (S710: YES), the controller 90 proceeds to S770 to change the current operating mode stored in the memory device 92 to the normal mode, and ends the first setting change mode process.

When the mode selection switch 74 is not manually operated (S710: NO), the controller 90 proceeds to S720 to determine whether the setting change switch 76 is manually operated. When the setting change switch 76 is not manually operated (S720: NO), the controller 90 proceeds to S760. When the setting change switch 76 is manually operated (S720: YES), the controller 90 proceeds to S730.

In S730, the controller 90 determines whether the current calibration setting of the calibration mode is a first calibration setting. In the third embodiment, the memory device 92 stores the current calibration setting (more specifically, a value corresponding to the current calibration setting) of the calibration mode in a rewritable manner.

When the current calibration setting stored in the memory device 92 is the first calibration setting (S730: YES), the controller 90 proceeds to S740 to change the current calibration setting stored in the memory device 92 to a second calibration setting, and proceeds to S760.

When the current calibration setting stored in the memory device 92 is not the first calibration setting (S730: NO), the controller 90 proceeds to S750 to change the current calibration setting stored in the memory device 92 to the first calibration setting, and proceeds to S760. In S760, the controller 90 outputs, to the display device 72, the indicator control signal for displaying the current calibration setting stored in the memory device 92 on the first through third display screens 72A through 72C to thereby display the current calibration setting on the display device 72. When the display of the current calibration setting is complete, the controller 90 ends the first setting change mode process.

As described above, the first setting change mode process is configured to switch the current calibration setting of the calibration mode between the first calibration setting and the second calibration setting each time the setting change switch 76 is manually operated.

The memory device 92 of the third embodiment stores a first reference value in association with the first calibration setting, and stores a second reference value in association with the second calibration setting. The user selects the first calibration setting or the second calibration setting in accordance with the type of grease or the surrounding environment.

2-3-3. Seventh Calibration Mode Process

Figure 17:
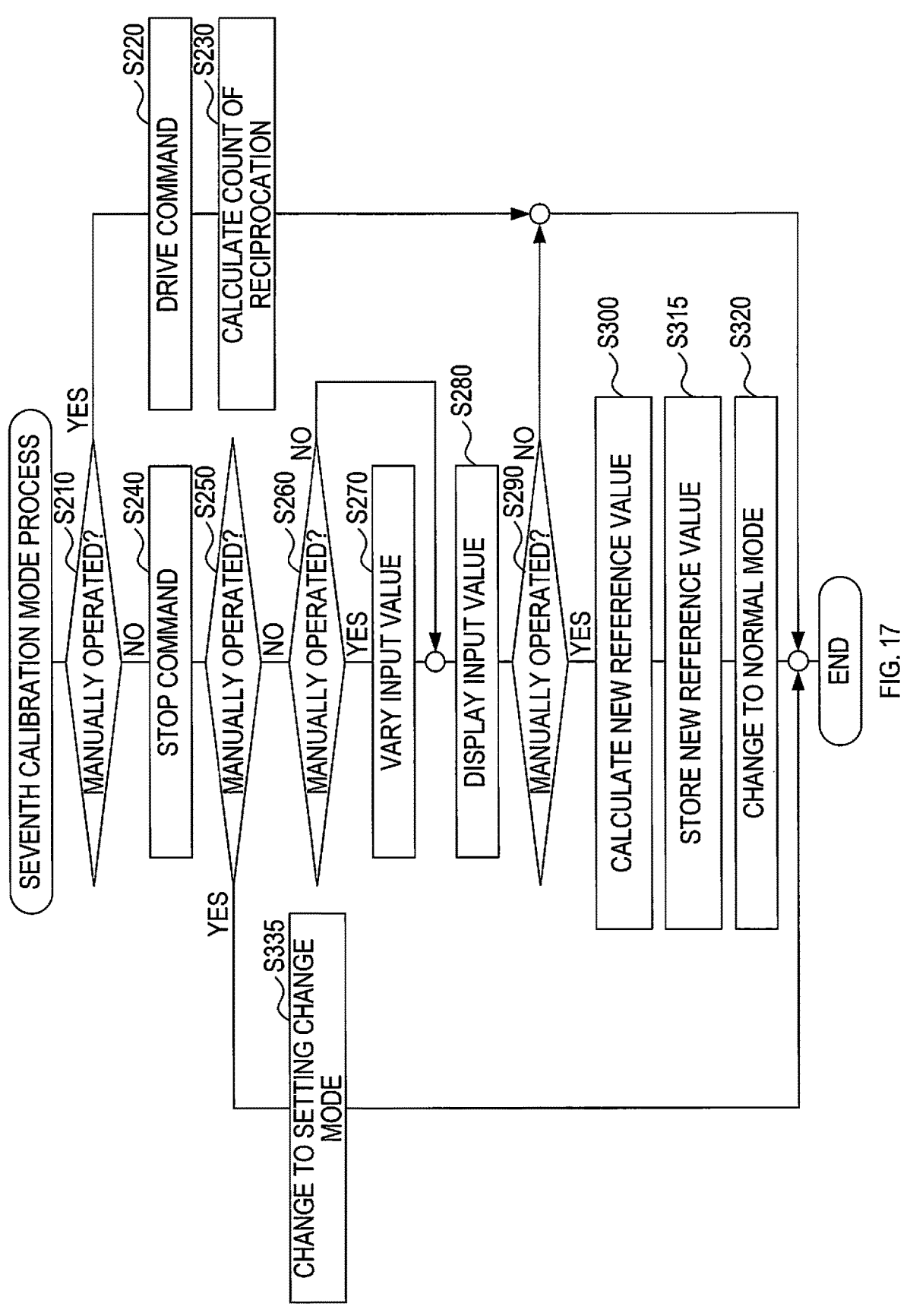
FIG. 17 is a flow chart showing a flow of a seventh calibration mode process.

As shown in FIG. 17, the seventh calibration mode process differs from the first calibration mode process in that S315 and S335 are executed in place of S310 and S330, respectively.

Specifically, upon calculation of a new reference value in S300, the controller 90 proceeds to S315 to store the calculated new reference value in association with the current calibration setting in the memory device 92, and proceeds to S320.

In S250, when the mode selection switch 74 is manually operated (S250: YES), the controller 90 proceeds to S335 to change the current operating mode stored in the memory device 92 from the calibration mode to the setting change mode, and ends the seventh calibration mode process.

2-3-4. Third Normal Mode Process

Figure 18:
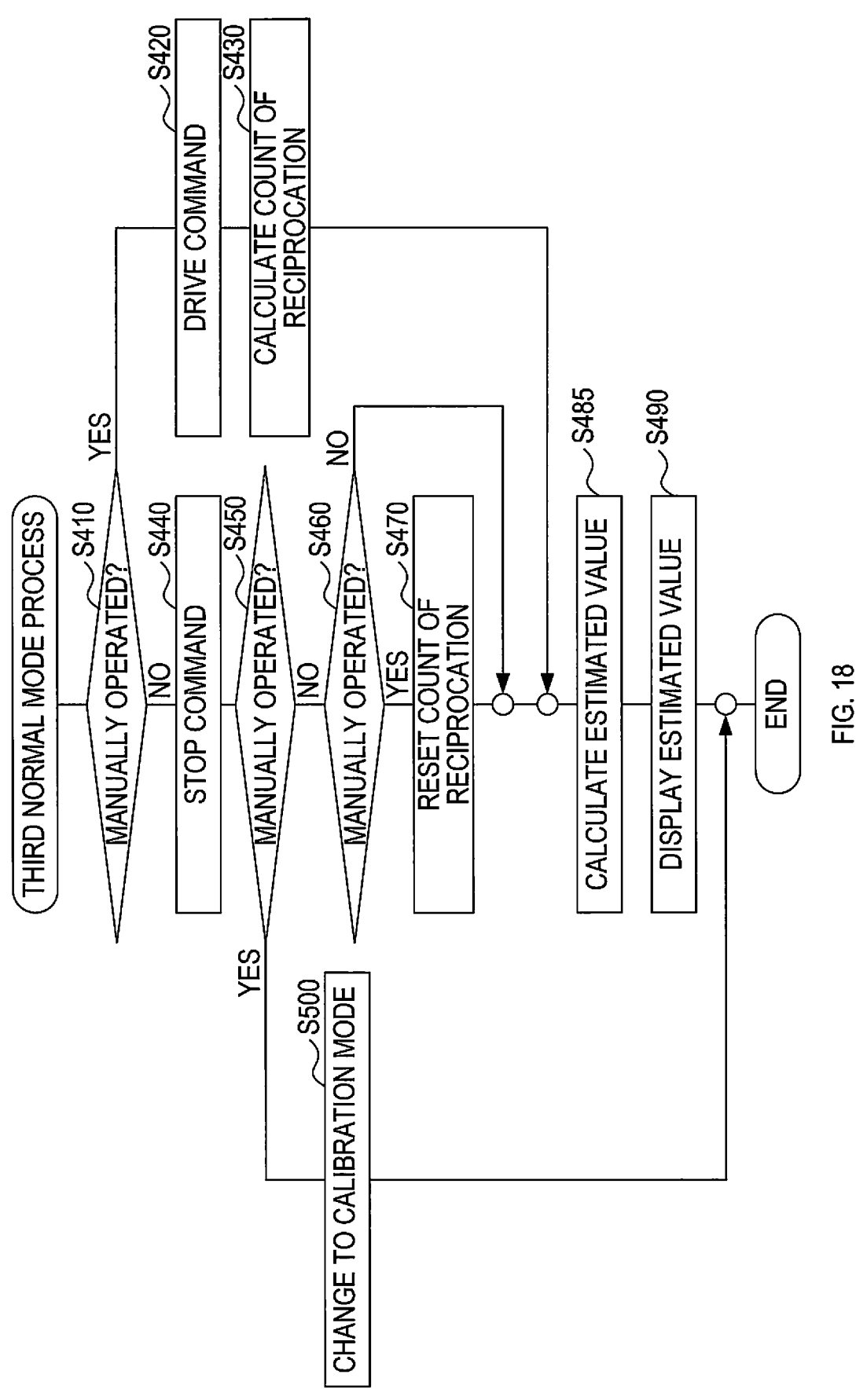
FIG. 18 is a flow chart showing a flow of a third normal mode process.

As shown in FIG. 18, the third normal mode process differs from the first normal mode process in that S485 is executed in place of S480.

In S485, the controller 90 calculates an estimated value based on the reference value stored in association with the current calibration setting and the count of reciprocation of the plunger 50.

2-3-5. Technical Effect of Third Embodiment

The electric-powered lubricator 1 of the third embodiment can store the first reference value and the second reference value. Thus, the user can acquire the accurate estimated value in the normal mode each time the type of grease is changed or each time the surrounding environment changes, without the user changing the operating mode of the control circuit 80 to the calibration mode.

2-3-6. Correspondence Between Terms

In the third embodiment, the setting change switch 76 corresponds to an example of the third manual switch in Overview of Embodiments.

2-3-7. Sixth Variation

The electric-powered lubricator 1 of the sixth variation differs from the electric-powered lubricator 1 of the third embodiment in that (i) a third reference value is stored in association with a third calibration setting in the memory device 92, in addition to the first reference value and the second reference value and (ii) the control device 90 executes a second setting change mode process in place of the first setting change mode process. The second setting change mode process corresponds to the first setting change mode process with some partial modifications. Accordingly, the following description focuses only on the portions modified from the first setting change mode process.

2-3-7-1. Second Setting Change Mode Process

Figure 19:
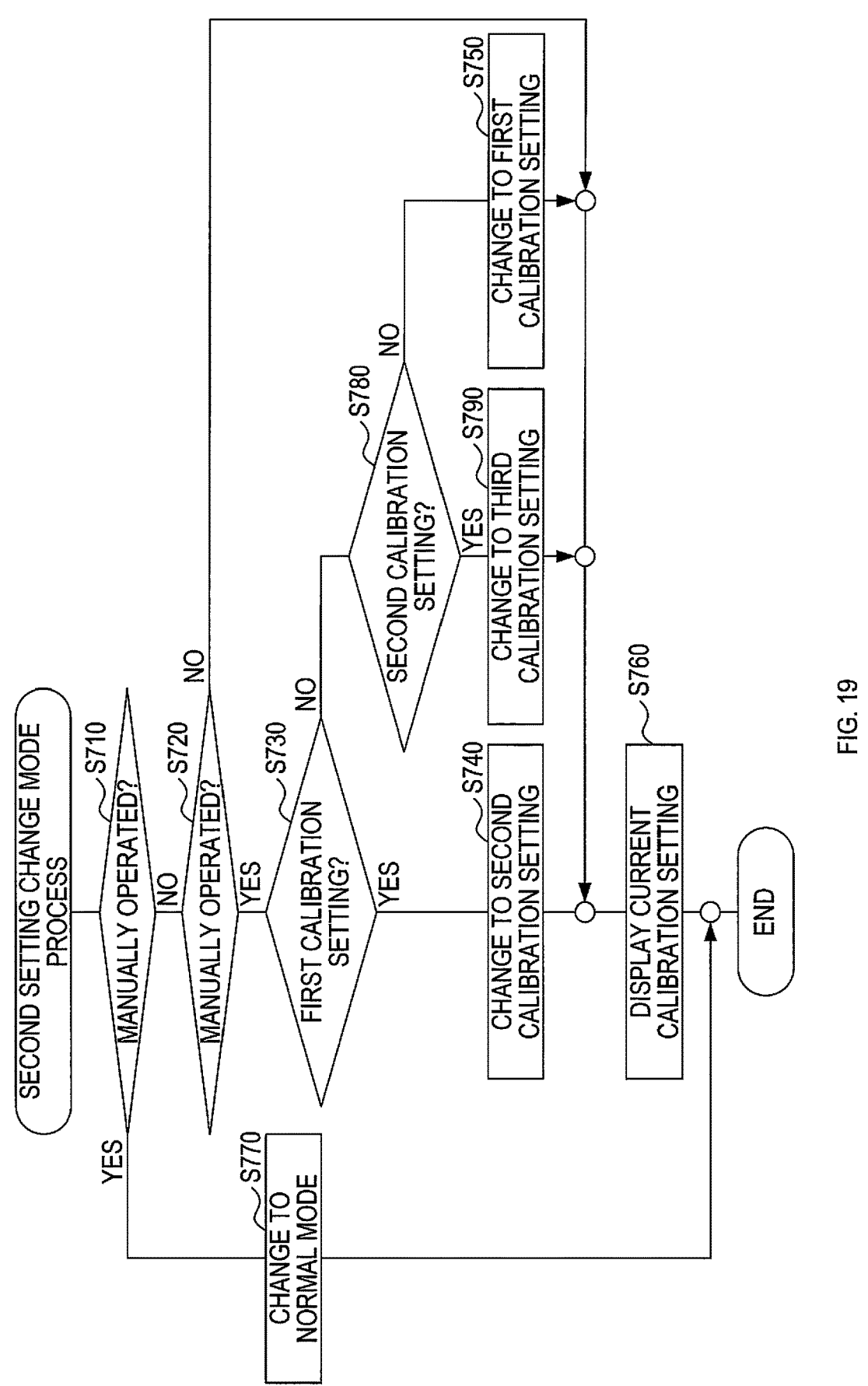
FIG. 19 is a flow chart showing a flow of a second setting change mode process.

As shown in FIG. 19, the second setting change mode process differs from the first setting change mode process in that S780 and S790 are added.

Specifically, in S730, when the current calibration setting stored in the memory device 92 is not the first calibration setting (S730: NO), the controller 90 proceeds to S780 to determine whether the current calibration setting is the second calibration setting. When the current calibration setting is not the second calibration setting (S780: NO), the controller 90 proceeds to S750. When the current calibration setting is the second calibration setting (S780: YES), the controller 90 proceeds to S790 to change the current calibration setting stored in the memory device 92 to the third calibration setting, and proceeds to S760.

2-3-7-2. Technical Effect of Sixth Variation

The electric-powered lubricator 1 of the sixth variation can calculate the accurate estimated value adapted to more types of greases or more surrounding environments as compared to the case of the electric-powered lubricator 1 of the third embodiment, without the user changing the operating mode of the control circuit 80 to the calibration mode.

2-4. Fourth Embodiment

The electric-powered lubricator 1 of the fourth embodiment differs from the electric-powered lubricator 1 of the first embodiment in that a third main routine is executed in place of the first main routine. The third main routine corresponds to the first main routine with some partial modifications. Accordingly, the following description focuses only on the portions modified from the first main routine.

2-4-1. Third Main Routine

The third main routine differs from the first main routine in that the operating mode of the control circuit 80 can be switched not only to the calibration mode and the normal mode but also to a manual input mode.

Figure 20:
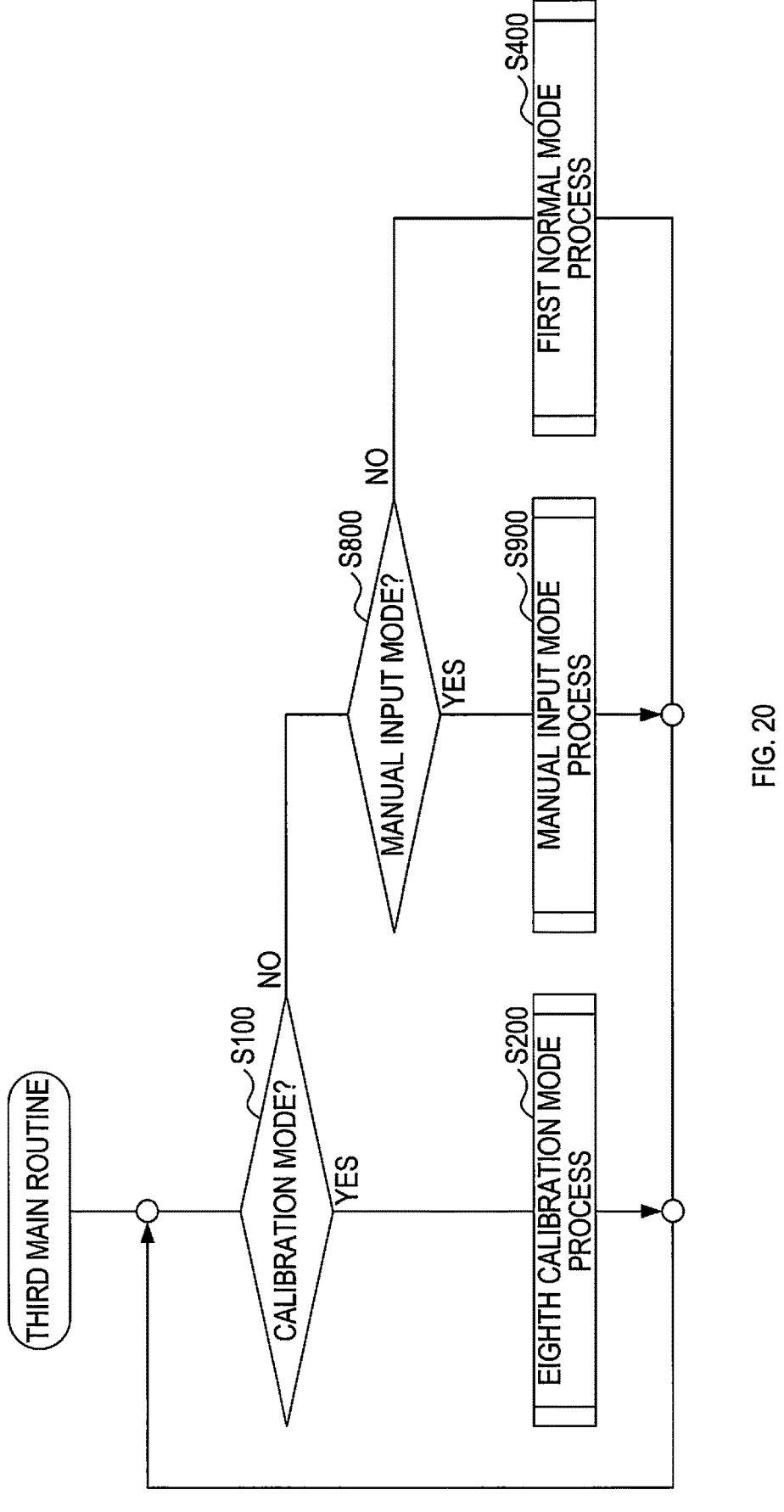
FIG. 20 is a flow chart showing a flow of a third main routine.

As shown in FIG. 20, the third main routine differs from the first main routine in that S800 and S900 are added. Moreover, the third main routine differs from the first main routine in that the eighth calibration mode process is executed in S200 in place of the first calibration mode process.

Specifically, in S100, when the current operating mode stored in the memory device 92 is not the calibration mode (S100: NO), the controller 90 proceeds to S800. In S800, the controller 90 determines whether the current operating mode stored in the memory device 92 is the manual input mode.

When the current operating mode is not the manual input mode (S800: NO), the controller 90 proceeds to S400. When the current operating mode is the manual input mode (S800: YES), the controller 90 proceeds to S900 to execute a manual input mode process.

In the third main routine of another embodiment, any one of the first through seventh calibration mode processes may be executed in S200 in place of the eighth calibration mode process, and the second normal mode process or the third normal mode process may be executed in S400 in place of the first normal mode process.

2-4-2. Manual Input Mode Process

Figure 21:
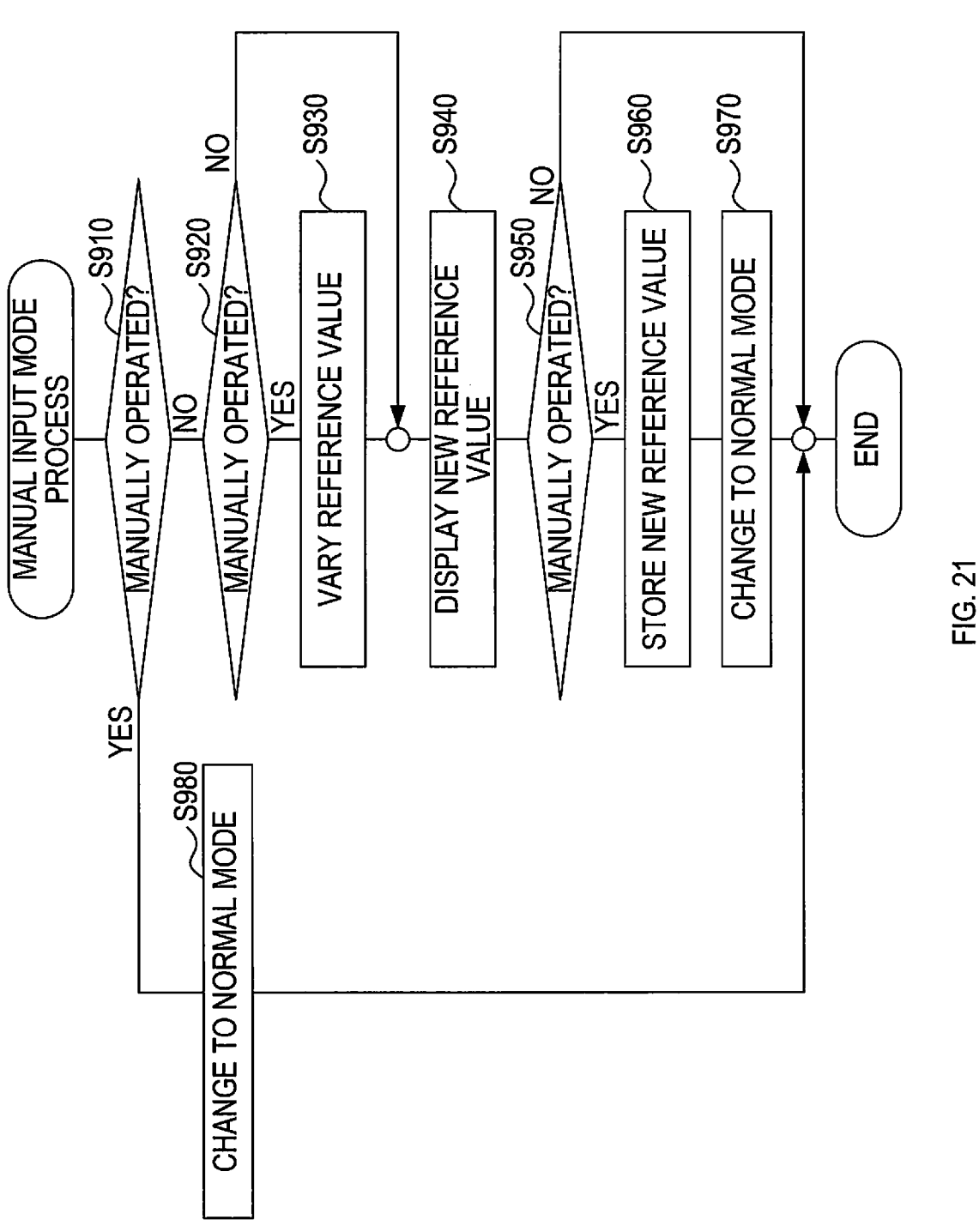
FIG. 21 is a flow chart showing a flow of a manual input mode process.

As shown in FIG. 21, the controller 90, firstly in S910, determines whether the mode selection switch 74 is manually operated. When the mode selection switch 74 is manually operated (S910: YES), the controller 90 proceeds to S980 to change the current operating mode stored in the memory device 92 to the normal mode, and ends the manual input mode process.

When the mode selection switch 74 is not manually operated (S910: NO), the controller 90 proceeds to S920 to determine whether the setting change switch 76 is manually operated. When the setting change switch 76 is not manually operated (S920: NO), the controller 90 proceeds to S940.

When the setting change switch 76 is manually operated (S920: YES), the controller 90 proceeds to S930.

In S930, the controller 90 acquires the reference value from the memory device 92, and varies the acquired reference value in accordance with the manual operation of the setting change switch 76. The user manually operates the setting change switch 76 based on the reference value to be manually entered in the electric-powered lubricator 1. In the fourth embodiment, the initial value of the reference value stored in the memory device 92 may be zero. The controller 90 may increment the acquired reference value in accordance with the manual operation of the setting change switch 76.

In S940, the controller 90 outputs, to the display device 72, the indicator control signal for displaying a new reference value (that is, the acquired reference value or the varied reference value) on the first through third display screens 72A through 72C to thereby display the new reference value on the display device 72.

In subsequent S950, the controller 90 determines whether the setting confirmation switch 78 is manually operated. When the setting confirmation switch 78 is not manually operated (S950: NO), the controller 90 ends the manual input mode process.

When the setting confirmation switch 78 is manually operated (S950: YES), the controller 90 proceeds to S960 to update (or overwrite) the reference value stored in the memory device 92 with the new reference value. In subsequent S970, the controller 90 changes the current operating mode stored in the memory device 92 to the normal mode, and ends the manual input mode process.

2-4-3. Eighth Calibration Mode Process

Figure 22:
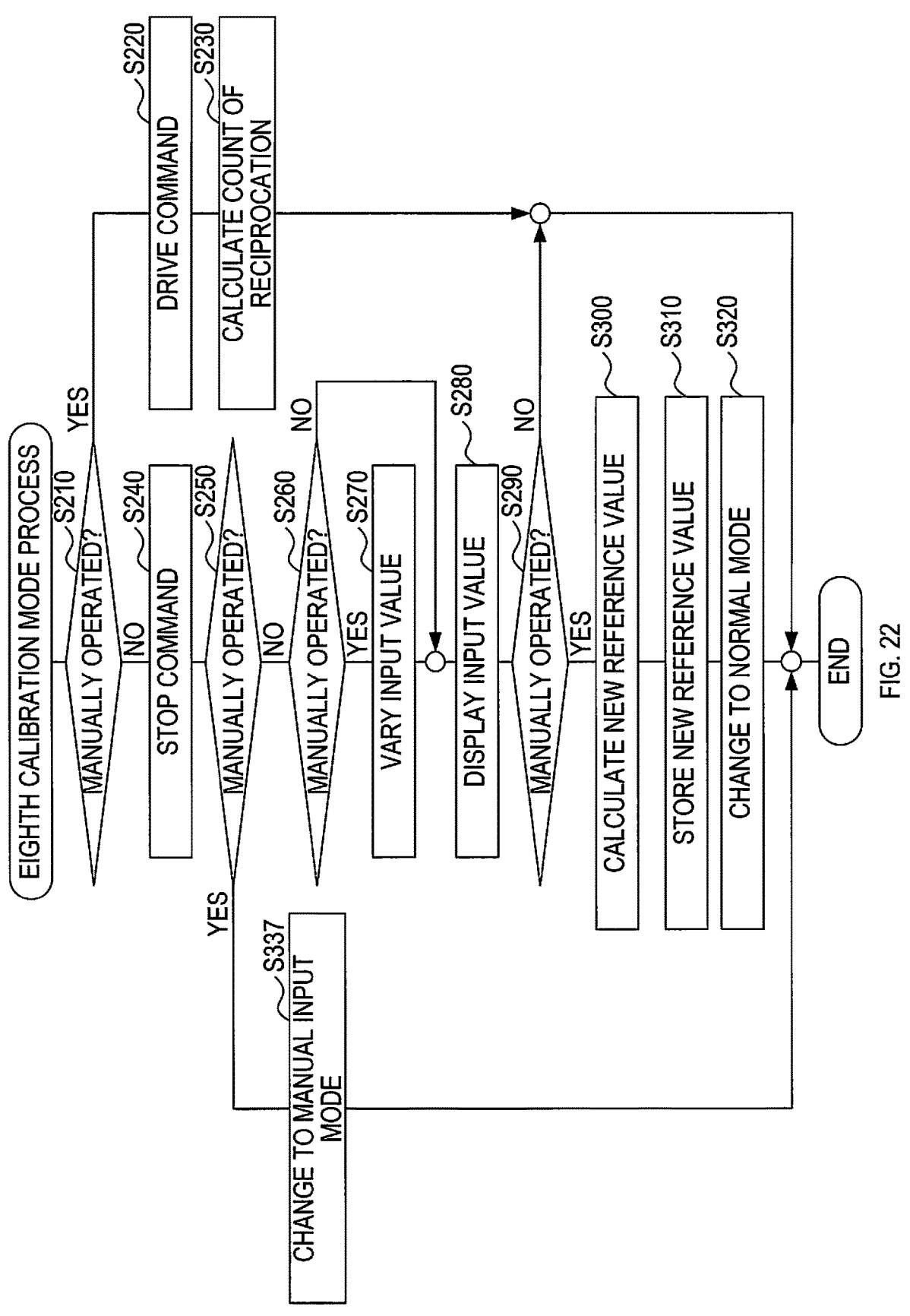
FIG. 22 is a flow chart showing a flow of an eighth calibration mode process.

As shown in FIG. 22, the eighth calibration mode process differs from the first calibration mode process in that S337 is executed in place of S330.

Specifically, in S250, when the mode selection switch 74 is manually operated (S250: YES), the controller 90 proceeds to S337 to change the current operating mode stored in the memory device 92 to the manual input mode, and ends the eighth calibration mode process.

2-4-4. Technical Effect of Fourth Embodiment

In the electric-powered lubricator 1 of the fourth embodiment, the user can manually enter the reference value to the electric-powered lubricator 1 by manually operating the setting change switch 76 and the setting confirmation switch 78.

Therefore, the user, who knows the reference value suitable for the type of grease or the surrounding environment, can set the reference value suitable for the type of grease or the surrounding environment to the electric-powered lubricator 1, without changing the operating mode of the control circuit 80 to the calibration mode.

2-4-5. Correspondence Between Terms

In the fourth embodiment, the setting change switch 76 corresponds to an example of the fourth manual switch in Overview of Embodiments.

2-5. Supplementary Explanation

The present disclosure is not limited to the first through fourth embodiments and the first through sixth variations, and can be practiced with various modifications.

Two or more functions achieved by one element of the aforementioned embodiments and variations may be achieved by two or more elements. One function achieved by one element may be achieved by two or more elements. Two or more functions achieved by two or more elements may be achieved by one element. One function achieved by two or more elements may be achieved by one element. Part of the configurations in the aforementioned embodiments and variations may be omitted. At least part of the configurations in one of the aforementioned embodiments and variations may be added to or replaced with the configuration in another one of the aforementioned embodiments and variations.

The present disclosure can be practiced in various aspects, other than the electric-powered lubricator, such as a system including an electric-powered lubricator, a computer program that causes a computer to function as an electric-powered lubricator, a non-transitory tangible storage medium such as a semiconductor memory that stores the computer program, and a method for detecting a dispensed amount of lubricant, and so on.

What is claimed is:

1. An electric-powered lubricator comprising:

a first manual switch configured to be manually operated by a user of the electric- powered lubricator;

an electric motor configured to generate a driving force;

a drive circuit configured to drive the electric motor;

a pump including a dispensing port, a chamber, and a plunger, the dispensing port communicating with the chamber, the chamber being configured to accommodate a lubricant, the plunger being (i) within the chamber and (ii) configured to reciprocate within the chamber by the driving force of the electric motor so as to dispense the lubricant within the chamber from the dispensing port;

a memory device configured to store one or more reference values, each of the one or more reference values corresponding to a mass of the lubricant to be dispensed from the dispensing port per reciprocation of the plunger; and a control circuit configured to switch its operating mode between two or more operating modes including a calibration mode and a normal mode;

the control circuit in the calibration mode being configured to perform:

a first operation to drive the electric motor via the drive circuit based on the first manual switch being manually operated;

a second operation to calculate a count of reciprocation of the plunger based on the first manual switch being manually operated;

a third operation to calculate a new reference value based on (i) an input value and (ii) the count of reciprocation, the input value corresponding to a total mass of the lubricant dispensed from the dispensing port, the input value being (i) manually provided to the electric lubricator by a user through an input interface, (ii) a fixed value set in the electric lubricator in advance, or (iii) automatically provided to the electric lubricator by an external device communicatively coupled with the electric lubricator; and a fourth operation to update any of the one or more reference values stored in the memory device with the new reference value calculated, the control circuit in the normal mode being configured to perform:

a fifth operation to drive the electric motor via the drive circuit based on the first manual switch being manually operated;

a sixth operation to calculate the count of reciprocation based on the first manual switch being manually operated;

a seventh operation to calculate an estimated value based on (i) any of the one or more reference values stored in the memory device and (ii) the count of reciprocation, the estimated value corresponding to an estimated total mass of the lubricant dispensed from the dispensing port; and an eighth operation (i) to display on a display device the estimated value calculated, and/or (ii) to control the electric motor via the drive circuit based on the estimated value calculated.

2. The electric-powered lubricator according to claim 1, wherein the control circuit in the calibration mode is configured to drive the electric motor via the drive circuit so as to reciprocate the plunger a predefined number of times in the first operation.

3. The electric-powered lubricator according to claim 1, further comprising a second manual switch as the input interface, the second manual switch being configured to be manually operated by the user, wherein the control circuit in the calibration mode is configured (i) to receive the input value via the second manual switch and (ii) to calculate the new reference value based on the input value received and the count of reciprocation, in the third operation.

4. The electric-powered lubricator according to claim 1, wherein:

the control circuit in the calibration mode is configured to receive the input value from the external device in the third operation, the external device being a scale; and the scale is configured (i) to measure an actual total mass of the lubricant dispensed from the dispensing port and (ii) to transmit the input value to the control circuit.

5. The electric-powered lubricator according to claim 1, wherein:

the memory device is configured to store the input value which is the fixed value, the control circuit in the calibration mode is configured to calculate the new reference value based on (i) the input value stored in the memory device and (ii) the count of reciprocation, in the third operation;

the control circuit in the calibration mode is further configured to perform a ninth operation (i) to receive the input value from the external device and (ii) to stop the electric motor via the drive circuit based on the input value received having reached the input value stored in the memory device, the external device being a scale; and the scale is configured (i) to measure an actual total mass of the lubricant dispensed from the dispensing port and (ii) to transmit the input value to the control circuit.

6. The electric-powered lubricator according to claim 1, wherein:

the control circuit in the normal mode is further configured to perform a tenth operation to stop the electric motor via the drive circuit based on the estimated value calculated having reached a desired value; and the desired value corresponds to a desired total mass of the lubricant dispensed from the dispensing port.

7. The electric-powered lubricator according to claim 1, further comprising a third manual switch configured to be manually operated by the user, wherein:

the two or more operating modes include a setting change mode;

the one or more reference values include two or more reference values;

the memory device is configured to store the two or more reference values in association with respective two or more calibration settings;

the control circuit in the setting change mode is configured to select one of the two or more calibration settings based on the third manual switch being manually operated;

the control circuit in the calibration mode is configured to update a reference value associated with the calibration setting selected, with the new reference value, in the fourth operation; and the control circuit in the normal mode is configured to calculate the estimated value based on (i) the reference value associated with the calibration setting selected and (ii) the count of reciprocation, in the seventh operation.

8. The electric-powered lubricator according to claim 1, further comprising a fourth manual switch configured to be manually operated by the user, wherein:

the two or more operating modes include a manual input mode; and the control circuit in the manual input mode is configured to update any of the one or more reference values stored in the memory device based on the fourth manual switch being manually operated.

9. The electric-powered lubricator according to claim 1, further comprising a fifth manual switch configured to be manually operated by the user, wherein the control circuit is configured to switch its operating mode between the two or more operating modes based on the fifth manual switch being manually operated.

10. The electric-powered lubricator according to claim 1, further comprising the display device.

11. The electric-powered lubricator according to claim 1, wherein the lubricant is in semisolid form.

12. The electric-powered lubricator according to claim 1, wherein the lubricant includes grease.

13. A method comprising:

(i) switching an electric-powered lubricator to a calibration mode, followed by:

manually operating a manual switch of the electric-powered lubricator to drive a plunger of the electric-powered lubricator in a reciprocating motion to thereby dispense a lubricant from the electric-powered lubricator;

calculating a count of reciprocation of the plunger during manual operation of the manual switch;

calculating a reference value based on (a) an input value and (b) the count of reciprocation, the reference value corresponding to a mass of the lubricant to be dispensed from the electric-powered lubricator per reciprocation of the plunger, the input value corresponding to a total mass of the lubricant dispensed from the electric-powered lubricator, the input value being (i) manually provided to the electric lubricator by a user through an input interface, (ii) a fixed value set in the electric lubricator in advance, or (iii) automatically provided to the electric lubricator by an external device communicatively coupled with the electric lubricator; and updating the reference value stored in a memory device of the electric-powered lubricator with the reference value calculated; and (ii) switching the electric-powered lubricator to a normal mode, followed by:

manually operating the manual switch to drive the plunger in the reciprocating motion to thereby dispense the lubricant from the electric-powered lubricator;

calculating the count of reciprocation of the plunger during manual operation of the manual switch;

calculating an estimated value based on (a) the reference value stored in the memory device and (b) the count of reciprocation, the estimated value corresponding to an estimated total mass of the lubricant dispensed from the electric-powered lubricator; and (a) displaying on a display device the estimated value calculated, and/or (b) controlling the plunger based on the estimated value calculated.

* * * * *